US008564926B2

(12) United States Patent
Prahlad et al.

(10) Patent No.: US 8,564,926 B2
(45) Date of Patent: *Oct. 22, 2013

(54) ELECTROADHESIVE GRIPPING

(71) Applicant: SRI International, Menlo Park, CA (US)

(72) Inventors: Harsha Prahlad, Cupertino, CA (US); Ronald E. Pelrine, Longmont, CO (US); Pablo E. Garcia, Menlo Park, CA (US); Richard Mahoney, Los Altos, CA (US); Joseph S. Eckerle, Woodside, CA (US)

(73) Assignee: SRI International, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/668,099

(22) Filed: Nov. 2, 2012

(65) Prior Publication Data
US 2013/0058001 A1 Mar. 7, 2013

Related U.S. Application Data

(63) Continuation of application No. 12/762,260, filed on Apr. 16, 2010, now Pat. No. 8,325,458.

(60) Provisional application No. 61/303,216, filed on Feb. 10, 2010.

(51) Int. Cl.
*H01T 23/00* (2006.01)
(52) U.S. Cl.
USPC .......................................................... 361/234
(58) Field of Classification Search
USPC .......................................................... 361/234
See application file for complete search history.

(56) References Cited

U.S. PATENT DOCUMENTS

| 6,922,324 | B1 | 7/2005 | Horwitz |
| 7,551,419 | B2 | 6/2009 | Pelrine et al. |
| 8,325,458 | B2 * | 12/2012 | Prahlad et al. ................ 361/234 |
| 2008/0089002 | A1 | 4/2008 | Pelrine et al. |

FOREIGN PATENT DOCUMENTS

| JP | 6-126661 | 5/1994 |
| JP | 2003-285289 | 10/2003 |

OTHER PUBLICATIONS

Search Reprot dated Apr. 27, 2011 from International Application No. PCT/US2010/060267.
Written Opinon dated Apr. 27, 2011 from International Application No. PCT/US2010/060267.

* cited by examiner

*Primary Examiner* — Stephen W Jackson
(74) *Attorney, Agent, or Firm* — McDonnell Boehnen Hulbert & Berghoff LLP

(57) ABSTRACT

An electroadhesive gripping device or system includes a plurality of electroadhesive gripping surfaces, each having electrode(s) and each configured to be placed against respective surface regions of a foreign object, such that one or more electroadhesive forces can be provided between the electroadhesive gripping surfaces and the foreign object. Such electroadhesive forces operating to hold the foreign object against the electroadhesive gripping surfaces while the foreign object is held or moved by the electroadhesive gripping system. The electroadhesive gripping surfaces can be arranged onto a plurality of continuous fingers, and various gripping surfaces on each finger can be coupled together and manipulated with respect to each other by an actuating component, such as a cable actuator. A variable voltage can be delivered to the electrodes to control the amount of electroadhesive force generated, such that only a portion of a foreign object is held or moved.

20 Claims, 12 Drawing Sheets

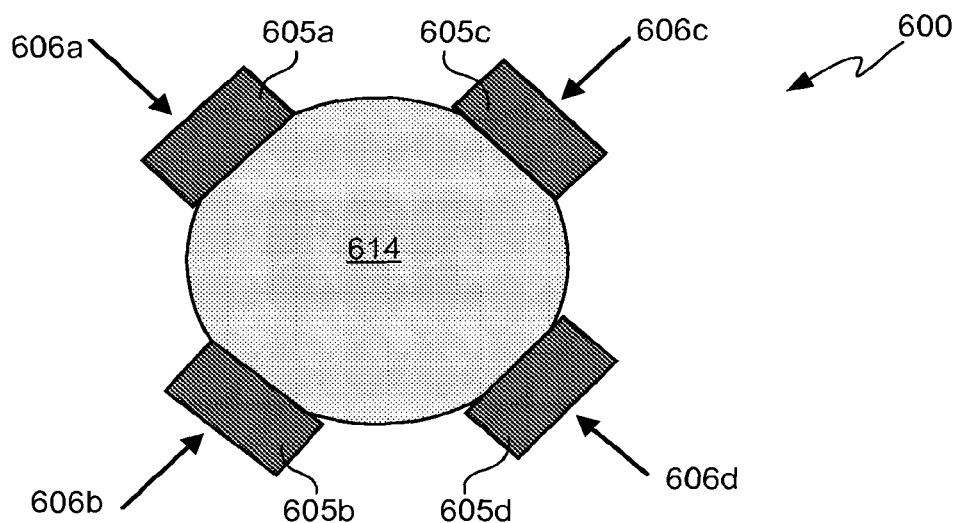
FIG. 6A *(prior art)*
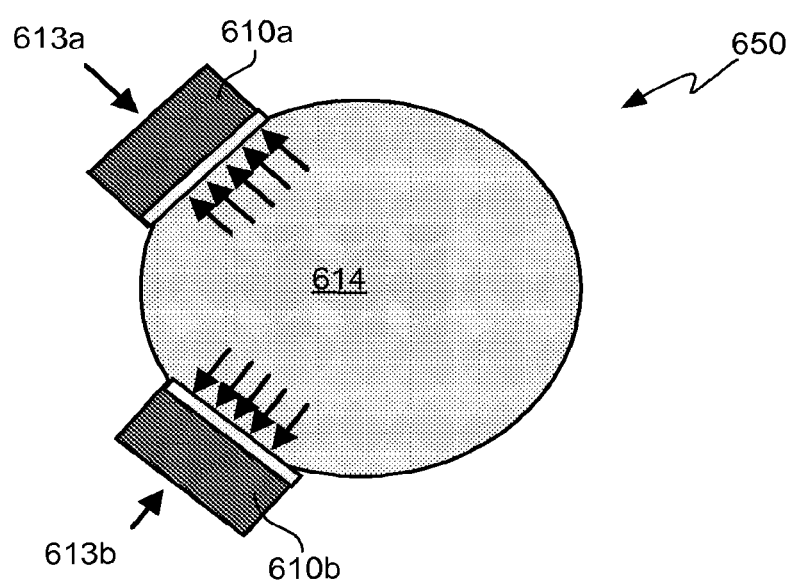
FIG. 6B

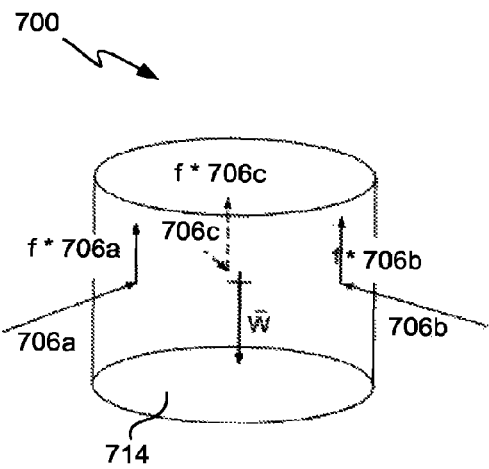
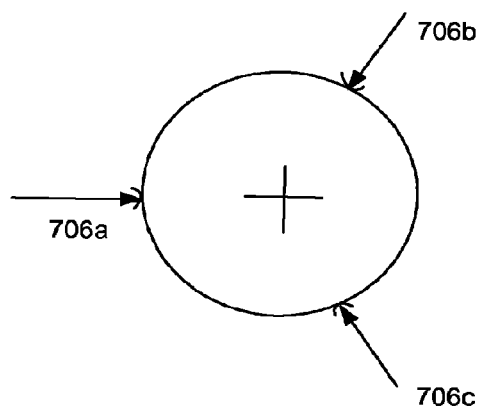
FIG. 7A  FIG. 7B
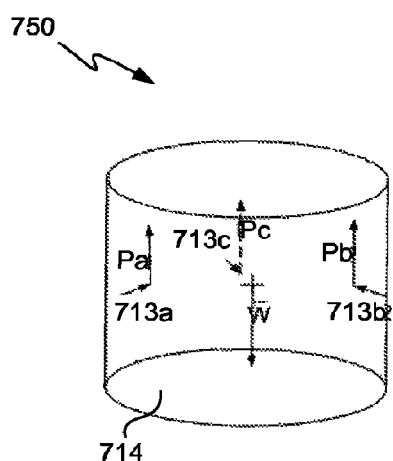
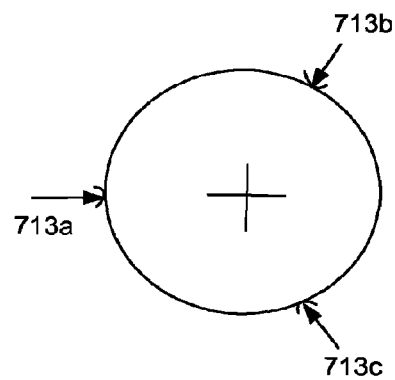
FIG. 7C  FIG. 7D

US 8,564,926 B2

ELECTROADHESIVE GRIPPING

CROSS-REFERENCE TO RELATED APPLICATIONS

This application is a continuation of and claims priority from co-pending and commonly owned U.S. patent application Ser. No. 12/762,260, filed Apr. 16, 2010, which claims priority to U.S. Provisional Patent Application No. 61/303,216, filed Feb. 9, 2010, both of which are entitled "Electroadhesive Gripping," and both of which are incorporated by reference herein in their entireties and for all purposes.

TECHNICAL FIELD

The present invention relates generally to the handling of materials, and more particularly to the use of electroadhesive force in the handling of materials.

BACKGROUND

The mass production of products has led to many innovations over the years. Substantial developments have been made in the industrial handling of various materials and items, particularly in the area of robotics. For example, various types of robotics and other automated systems are now used in order to "pick and place" items during many manufacturing and other materials handling processes. Such robotics and other systems can include robot arms that, for example, grip, lift and/or place an item as part of a designated process. Of course, other manipulations and materials handling techniques can also be accomplished by way of such robotics or other automated systems. Despite many advances over the years in this field, there are limitations as to what can be handled in such a manner.

Conventional robotic grippers typically use either suction or a combination of large normal forces and fine control with mechanical actuation in order to grip objects. Such techniques have several drawbacks. For example, the use of suction tends to require smooth, clean, dry and generally flat surfaces, which limits the types and conditions of objects that can be gripped. Suction also tends to require a lot of power for the pumps and is prone to leaks at any location on a vacuum or low pressure seal, with a resulting loss of suction being potentially catastrophic. The use of mechanical actuation often requires large normal or "crushing" forces against an object, and also tends to limit the ability to robotically grip fragile or delicate objects. Producing large forces also increases the cost of mechanical actuation. Mechanical pumps and conventional mechanical actuation with large crushing forces also often require substantial weight, which is a major disadvantage for some applications, such as the end of a robot arm where added mass must be supported. Furthermore, even when used with sturdy objects, robotic arms, mechanical claws and the like can still leave damaging marks on the surface of the object itself.

Alternative techniques for handling items and materials also have drawbacks. For example, chemical adhesives can leave residues and tend to attract dust and other debris that reduce effectiveness. Chemical adhesives can also require a significant amount of added force to undo or overcome a grip or attachment to an object once such a chemical adhesive grip or attachment is applied, since the gripping interaction and force is typically not reversible in such instances.

Although many systems and techniques for handling materials in an automated fashion have generally worked well in the past, there is always a desired to provide alternative and improved ways of handling items. In particular, what is desirable are new automated systems and techniques that permit the picking and placing or other handling of objects that are large, irregular shaped, dusty and/or fragile, and preferably with little to no use of suction, chemical adhesives or significant mechanical normal forces against the objects.

SUMMARY

It is an advantage of the present invention to provide improved automated materials handling systems and techniques that permit the handling of a wide variety of objects without the use of suction, chemical adhesives or significant mechanical normal forces against the objects. This can be accomplished through the use of electroadhesive forces in an electroadhesive gripping system, such that the object is held or moved by way of such electroadhesive forces.

The present invention provides electroadhesion technology that permits controllable adherence between two objects, such as a controlled electroadhesive gripper and a foreign object to be handled. Electroadhesion uses electrostatic forces of attraction produced by an electrostatic adhesion voltage, which is applied using electrodes in an electroadhesive device. The electrostatic adhesion voltage produces an electric field and electrostatic adherence forces. When the electroadhesive device is positioned against or near a surface of an object to be handled, the electrostatic adherence forces hold the object to the electroadhesive device. This can be used to increase traction or shear (i.e., anti-slip) forces between the electroadhesive device and the handled object. Electrical control of the electrostatic adhesion voltage permits the adhesion to be controllably and readily turned on and off. Variances in the electrostatic adhesion voltages can be used to vary the electroadhesive force.

In various embodiments of the present invention, an electroadhesive gripper, gripping system or device can include a first electroadhesive end effector or gripping surface having at least one electrode and a second electroadhesive end effector or gripping surface having at least one electrode, wherein the first and second electroadhesive gripping surfaces combine to provide an overall electroadhesive force that operates to hold a foreign object against the electroadhesive gripping surfaces while the foreign object is held or moved by the electroadhesive gripping system. The electroadhesive end effectors or gripping surfaces can be configured to be placed against a first surface region of a foreign object having a three-dimensional shape, and can be adapted to be moved independently with respect to each other. In some embodiments, one or more of the electroadhesive gripping surfaces can include a deformable surface portion adapted to conform to at least one aspect particular to a corresponding surface region of the foreign object. Such a deformable surface portion can be adapted to move closer to the surface region of the foreign object when voltage is applied to the respective electroadhesive gripping surface. The foreign object can have a round, cylindrical or irregular three-dimensional shape, and/or be fragile in some embodiments.

In some embodiments, the electroadhesive gripping system can be located on a single end effector that is either fixed in geometry or that is flexible and can wrap around various foreign objects, such as like fingers on a hand. Such embodiments can result in gripping forces that are parallel to the various surfaces of a foreign object to be handled. Multiple electroadhesive gripping surfaces can be located on a single end effector. Alternatively, multiple electroadhesive end effectors can be used, with each end effector having one or more gripping surfaces. In some embodiments, an electroadhesive end effector can resemble a human hand. Alternatively, a single electroadhesive end effector can define a thin and flexible veil having a plurality of electrode pairs in other embodiments, with each electrode pair defining a separate gripping surface.

An electroadhesive gripping surface can include a first electrode configured to apply a first voltage at a first surface location at a surface region and a second electrode configured to apply a second voltage at a second surface location at the surface region of the foreign object, such that the difference in voltage between the first voltage and second voltage includes an electrostatic adhesion voltage that produces a local electroadhesive force. In addition, an insulation material can be disposed between the first and second electrodes, and can be configured to substantially maintain the electrostatic adhesion voltage difference between said first and second electrodes. In various embodiments, the electroadhesive gripping surface can be less than about 1 millimeter from the surface of the foreign object when an electrostatic adhesion voltage is applied and/or maintained (i.e., is on).

A third electroadhesive gripping surface having at least one electrode can similarly configured to be placed against a third surface region of the foreign object such that additional electroadhesive force can be applied from the system to the foreign object. Further electroadhesive gripping surfaces may also be included in a similar manner. Such various electroadhesive gripping surfaces can be or be part of an electroadhesive gripping unit or gripping component.

In various detailed embodiments, an actuating component can be coupled to the first and second electroadhesive gripping surfaces, with such an actuating component being configured to help position each of said electroadhesive gripping surfaces with respect to the foreign object. Such an actuating component or system can also be used to shape one or more electroadhesive end effectors and/or gripping surfaces so as to conform around an object. Such shaping can be similar to hands and fingers conforming to a foreign object to be gripped. Such an actuating component or system can be a cable driven by an actuator, an electromagnetic motor, a stepper motor, a hydraulic system, a pneumatic system, a shape memory alloy, and an electroactive polymer, among other possible actuating components. In some embodiments, such as when the electroadhesive surface can be a light thin film or veil, the electroadhesion itself can provide actuation to grasp a foreign object.

In various embodiments, the overall electroadhesive force can be a variable force that depends upon a variable voltage delivered to the electrodes of the electroadhesive gripping surfaces or end effectors. Such a variable overall electroadhesive force can be varied such that only a portion of the foreign object is held or moved, rather than the entire foreign object. A variable electroadhesive force can also be used to modulate friction on the gripping surface, so as to reposition objects by controllably sliding objects within or about the gripping surface. The first and second electroadhesive gripping surfaces can operate to pick, lift and place the foreign object in some embodiments, while in other embodiments the foreign object is only moved or held by the gripping surfaces. In various embodiments, various substantial forces exerted against the foreign object by the electroadhesive gripping system while the foreign object is lifted or moved thereby are electroadhesive forces.

In various embodiments, the first electroadhesive gripping surface can be configured to move relative to both the foreign object and the second electroadhesive gripping surface while the electroadhesive gripping system is preparing to grip the foreign object. In some embodiments, the second electroadhesive gripping surface can similarly be configured to move relative to both the foreign object and the first electroadhesive gripping surface while the electroadhesive gripping system is preparing to grip the foreign object. In some embodiments, the first electroadhesive gripping surface cannot move relative to the second electroadhesive gripping surface while the electroadhesive gripping system grips the foreign object. In some embodiments, the movement of electroadhesive gripping surfaces can supplement or replace the various actuation methods or techniques provided herein.

In various embodiments, the electroadhesive gripping surfaces or gripping units can be formed along one or more continuous fingers of the electroadhesive gripper, gripping system or device. Such continuous fingers can be adapted to extend around surfaces of the foreign object in different directions. In particular, a first finger having a first plurality of electroadhesive gripping surfaces, each including at least one electrode, can be configured to be placed against a foreign object such that an electroadhesive force between the electroadhesive gripping surfaces and the foreign object can be generated. Also, a second finger having a second plurality of electroadhesive gripping surfaces, each including at least one electrode, can be configured to be placed against the foreign object, the second finger being configured to operate to provide another electroadhesive force between the electroadhesive gripping surfaces and the foreign object. The various electroadhesive gripping surfaces can be formed from two different sets of electroadhesive materials, or can be made from a single monolithic material attached to two different end effectors.

In addition, one or more actuating components, such as a cable driven by an actuator, can be used to couple and control the various electroadhesive gripping surfaces or gripping units on each separate continuous finger. For example, a first actuating component can be coupled to each of said first plurality of electroadhesive gripping surfaces, with such a first actuating component being configured to help position each of the first plurality of electroadhesive gripping surfaces with respect to each other and the foreign object.

In various embodiments of the present invention, methods for moving or handling an object using electroadhesive force are provided. Process steps can include placing a first electroadhesive gripping surface having at least one electrode against a first surface region of a foreign object, moving a second electroadhesive gripping surface having at least one electrode with respect to the first electroadhesive gripping surface, placing the second electroadhesive gripping surface against a second surface region of the foreign object, applying a first electrostatic adhesion voltage difference at a plurality of the electrodes of one or both of said first and second electroadhesive gripping surfaces, and moving the electroadhesive gripping surfaces while maintaining substantially the first electrostatic adhesion voltage difference at the plurality of electrodes so that the object is also moved thereby. In some embodiments, the first and second electroadhesive gripping surfaces may be moved and placed simultaneously on the foreign object. In some embodiments, the electrostatic adhesion voltage may be turned on before the electroadhesive gripping surfaces touch the foreign object.

Additional process steps can include applying a second electrostatic adhesion voltage difference at a different plurality of the electrodes of one or both of the first and second electroadhesive gripping surfaces such that a second electrostatic attraction force is created in a second direction between one or both of the first and second electroadhesive gripping surfaces and the foreign object. Again, the actuator can be selected from the group consisting of a cable driven by an actuator, an electromagnetic motor, a stepper motor, a hydraulic system, a pneumatic system, a shape memory alloy, and an electroactive polymer, among others. Furthermore, each of said first and second electroadhesive gripping surfaces can include a plurality of electrodes, such that each of said first and second electroadhesive gripping surfaces are adapted to provide a localized electrostatic adhesion voltage difference at their respect surface regions of the foreign object.

Other apparatuses, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The included drawings are for illustrative purposes and serve only to provide examples of possible structures and arrangements for the disclosed inventive electroadhesive gripping systems and methods. These drawings in no way limit any changes in form and detail that may be made to the invention by one skilled in the art without departing from the spirit and scope of the invention.

FIG. 6A illustrates in top plan view an exemplary spherical or cylindrical foreign object being gripped by traditional mechanically gripping actuators.

FIG. 6B illustrates in top plan view the foreign object of FIG. 6A being gripped by electroadhesive gripping surfaces according to one embodiment of the present invention.

FIG. 7A illustrates in side perspective view an exemplary force diagram for a foreign object being gripped by traditional mechanically gripping actuators.

FIG. 7B illustrates in top plan view the exemplary force diagram for the foreign object of FIG. 7A.

FIG. 7C illustrates in side perspective view an exemplary force diagram for a foreign object being gripped by electroadhesive gripping surfaces according to one embodiment of the present invention.

FIG. 7D illustrates in top plan view the exemplary force diagram for the foreign object of FIG. 7C.

DETAILED DESCRIPTION

Figure 1A:
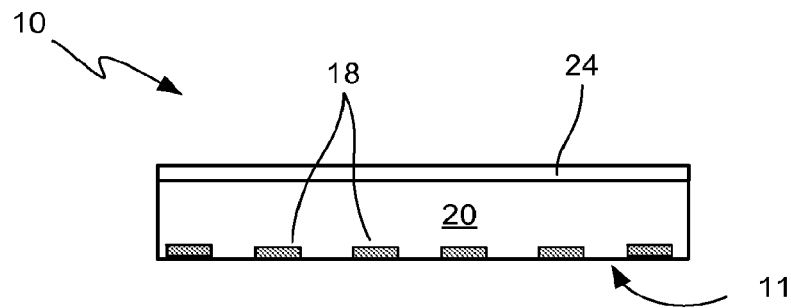
FIG. 1A illustrates in side cross-sectional view an exemplary electroadhesive end effector according to one embodiment of the present invention.

Exemplary applications of apparatuses and methods according to the present invention are described in this section. These examples are being provided solely to add context and aid in the understanding of the invention. It will thus be apparent to one skilled in the art that the present invention may be practiced without some or all of these specific details. In other instances, well known process steps have not been described in detail in order to avoid unnecessarily obscuring the present invention. Other applications are possible, such that the following examples should not be taken as limiting.

In the following detailed description, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting; such that other embodiments may be used, and changes may be made without departing from the spirit and scope of the invention.

The invention relates in various embodiments to an electroadhesive gripping device or system adapted to handle objects and materials. In particular, such an electroadhesive gripping system can be adapted to hold, move or even pick and place a wide variety of objects, including small, dirty and/or fragile objects. Such handling can be accomplished with minimal mechanical or "crushing" forces from the gripping system onto the foreign object, due to the use of mostly electroadhesive forces. In addition to the moving and picking and placement of items, further applications of the provided electroadhesive gripping system are also possible, such that it will be understood that the provided electroadhesive gripping system is not limited to use to such applications. For example, the same or similar electroadhesive gripping system components can be used in a glove to be worn by a user, such as to aid the user in gripping an object despite the onset of arthritis or other weakness. Additional alternative applications may also be practiced, as will be readily appreciated.

Electroadhesion

As the term is used herein, 'electroadhesion' refers to the mechanical coupling of two objects using electrostatic forces. Electroadhesion as described herein uses electrical control of these electrostatic forces to permit temporary and detachable attachment between two objects. This electrostatic adhesion holds two surfaces of these objects together or increases the traction or friction between two surfaces due to electrostatic forces created by an applied electric field. Although electrostatic clamping has traditionally been limited to holding two flat, smooth and generally conductive surfaces together, the present invention involves electroadhesion devices and techniques that do not limit the material properties or surface roughness of the objects subject to electroadhesive forces and handling.

Turning first to FIG. 1A, an exemplary electroadhesive end effector according to one embodiment of the present invention is illustrated in elevated cross-sectional view. Electroadhesive end effector 10 includes one or more electrodes 18 located at or near an "electroadhesive gripping surface" 11 thereof, as well as an insulating material 20 between electrodes and a backing 24 or other supporting structural component. For purposes of illustration, electroadhesive end effector 10 is shown as having six electrodes in three pairs, although it will be readily appreciated that more or fewer electrodes can be used in a given electroadhesive end effector. Where only a single electrode is used in a given electroadhesive end effector, a complimentary electroadhesive end effector having at least one electrode of the opposite polarity is preferably used therewith. With respect to size, electroadhesive end effector 10 is substantially scale invariant. That is, electroadhesive end effector sizes may range from less than 1 square centimeter to greater than several meters in surface area. Even larger and smaller surface areas also possible, and may be sized to the needs of a given application.

Figure 1B:
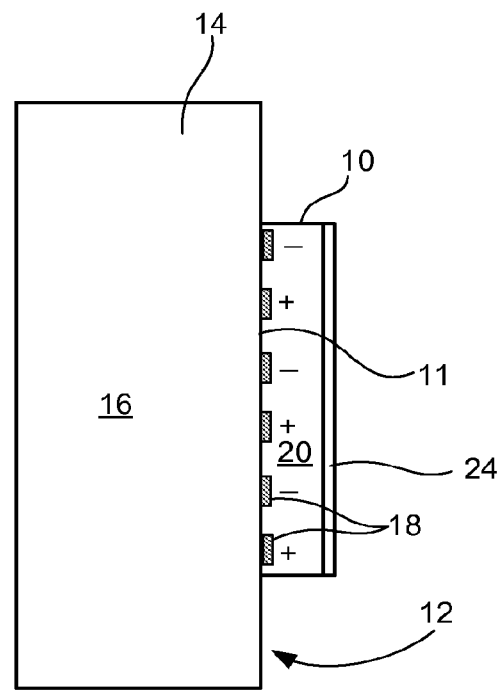
FIG. 1B illustrates in side cross-sectional view the exemplary electroadhesive end effector of FIG. 1A adhered to a foreign object according to one embodiment of the present invention.

FIG. 1B depicts in elevated cross-sectional view the exemplary electroadhesive end effector 10 of FIG. 1A adhered to a foreign object 14 according to one embodiment of the present invention. Foreign object 14 includes surface 12 and inner material 16. Electroadhesive gripping surface 11 of electroadhesive end effector 10 is placed against or nearby surface 12 of foreign object 14. An electrostatic adhesion voltage is then applied via electrodes 18 using external control electronics (not shown) in electrical communication with the electrodes 18. As shown in FIG. 1B, the electrostatic adhesion voltage uses alternating positive and negative charges on neighboring electrodes 18. As result of the voltage difference between electrodes 18, one or more electroadhesive forces are generated, which electroadhesive forces act to hold the electroadhesive end effector 10 and foreign object 14 against each other. Due to the nature of the forces being applied, it will be readily appreciated that actual contact between electroadhesive end effector 10 and foreign object 14 is not necessary. For example, a piece of paper, thin film, or other material or substrate may be placed between electroadhesive end effector 10 and foreign object 14. Furthermore, although the term "contact" is used herein to denote the interaction between an electroadhesive end effector and a foreign object, it will be understood that actual direct surface to surface contact is not always required, such that one or more thin objects such as an insulator, can be disposed between an end effector or electroadhesive gripping surface and the foreign object. In some embodiments such an insulator between the gripping surface and foreign object can be a part of the end effector, while in others it can be a separate item or device.

Figure 1C:
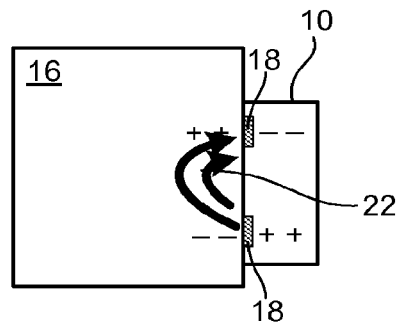
FIG. 1C illustrates in side cross-sectional close-up view an electric field formed in the foreign object of FIG. 1B as result of the voltage difference between electrodes in the adhered exemplary electroadhesive end effector according to one embodiment of the present invention.

FIG. 1C illustrates in elevated cross-sectional close-up view an electric field formed in the foreign object of FIG. 1B as result of the voltage difference between electrodes in the adhered exemplary electroadhesive end effector 10. While the electroadhesive end effector 10 is placed against foreign object 14 and an electrostatic adhesion voltage is applied, an electric field 22 forms in the inner material 16 of the foreign object 14. The electric field 22 locally polarizes inner material 16 or induces direct charges on material 16 locally opposite to the charge on the electrodes of the end effector 18 and thus causes electrostatic adhesion between the electrodes 18 (and end effector 10) and the induced charges on the foreign object 16. The induced charges may be the result of a dielectric polarization or from weakly conductive materials and electrostatic induction of charge. In the event that the inner material 16 is a strong conductor, such as copper for example, the induced charges may completely cancel the electric field 22. In this case the internal electric field 22 is zero, but the induced charges nonetheless still form and provide electrostatic force to the electroadhesive end effector.

Thus, the electrostatic adhesion voltage provides an overall electrostatic force, between the electroadhesive end effector 10 and inner material 16 beneath surface 12 of foreign object 14, which electrostatic force maintains the current position of the electroadhesive end effector relative to the surface of the foreign object. The overall electrostatic force may be sufficient to overcome the gravitational pull on the foreign object 14, such that the electroadhesive end effector 10 may be used to hold the foreign object aloft. In various embodiments, a plurality of electroadhesive end effectors may be placed against foreign object 14, such that additional electrostatic forces against the object can be provided. The combination of electrostatic forces may be sufficient to lift, move, pick and place, or otherwise handle the foreign object. Electroadhesive end effector 10 may also be attached to other structures and hold these additional structures aloft, or it may be used on sloped or slippery surfaces to increase normal friction forces Removal of the electrostatic adhesion voltages from electrodes 18 ceases the electrostatic adhesion force between electroadhesive end effector 10 and the surface 12 of foreign object 14. Thus, when there is no electrostatic adhesion voltage between electrodes 18, electroadhesive end effector 10 can move more readily relative to surface 12. This condition allows the electroadhesive end effector 10 to move before and after an electrostatic adhesion voltage is applied. Well controlled electrical activation and de-activation enables fast adhesion and detachment, such as response times less than about 50 milliseconds, for example, while consuming relatively small amounts of power.

Electroadhesive end effector 10 includes electrodes 18 on an outside surface 11 of an insulating material 20. This embodiment is well suited for controlled attachment to insulating and weakly conductive inner materials 14 of various foreign objects 16. Other electroadhesive end effector 10 relationships between electrodes 18 and insulating materials 20 are also contemplated and suitable for use with a broader range of materials, including conductive materials. For example, a thin electrically insulating material (not shown) can be located on the surfaces of the electrodes where surface 12 is on a metallic object. As will be readily appreciated, a shorter distance between surfaces 11 and 12 results in a stronger electroadhesive force between the objects. Accordingly, a deformable surface 11 adapted to at least partially conform to the surface 12 of the foreign object 14 can be used.

As the term is used herein, an electrostatic adhesion voltage refers to a voltage that produces a suitable electrostatic force to couple electroadhesive end effector 10 to a foreign object 14. The minimum voltage needed for electroadhesive end effector 10 will vary with a number of factors, such as: the size of electroadhesive end effector 10, the material conductivity and spacing of electrodes 18, the insulating material 20, the foreign object material 16, the presence of any disturbances to electroadhesion such as dust, other particulates or moisture, the weight of any objects being supported by the electroadhesive force, compliance of the electroadhesive device, the dielectric and resistivity properties of the foreign object, and the relevant gaps between electrodes and foreign object surface. In one embodiment, the electrostatic adhesion voltage includes a differential voltage between the electrodes 18 that is between about 500 volts and about 10 kilovolts. Even lower voltages may be used in micro applications. In one embodiment, the differential voltage is between about 2 kilovolts and about 5 kilovolts. Voltage for one electrode can be zero. Alternating positive and negative charges may also be applied to adjacent electrodes 18. The voltage on a single electrode may be varied in time, and in particular may be alternated between positive and negative charge so as to not develop substantial long-term charging of the foreign object. The resultant clamping forces will vary with the specifics of a particular electroadhesive end effector 10, the material it adheres to, any particulate disturbances, surface roughness, and so forth. In general, electroadhesion as described herein provides a wide range of clamping pressures, generally defined as the attractive force applied by the electroadhesive end effector divided by the area thereof in contact with the foreign object The actual electroadhesion forces and pressure will vary with design and a number of factors. In one embodiment, electroadhesive end effector 10 provides electroadhesive attraction pressures between about 0.7 kPa (about 0.1 psi) and about 70 kPa (about 10 psi), although other amounts and ranges are certainly possible. The amount of force needed for a particular application may be readily achieved by varying the area of the contacting surfaces, varying the applied voltage, and/or varying the distance between the electrodes and foreign object surface, although other relevant factors may also be manipulated as desired.

Because an electrostatic adhesion force is the primary force used to hold, move or otherwise manipulate a foreign object, rather than a traditional mechanical or "crushing" force, the electroadhesive end effector 10 can be used in a broader set of applications. For example, electroadhesive end effector 10 is well suited for use with rough surfaces, or surfaces with macroscopic curvature or complex shape. In one embodiment, surface 12 includes roughness greater than about 100 microns. In a specific embodiment, surface 12 includes roughness greater than about 3 millimeters. In addition, electroadhesive end effector 10 can be used on objects that are dusty or dirty, as well as objects that are fragile. Objects of varying sizes and shapes can also be handled by one or more electroadhesive end effectors, as set forth in greater detail below. Various additional details and embodiments regarding electroadhesion and applications thereof can be found at, for example, commonly owned U.S. Pat. Nos. 7,551,419 and 7,554,787, which are incorporated by reference herein in their entirety and for all purposes.

Electroadhesive Gripping Surfaces

Figure 10:
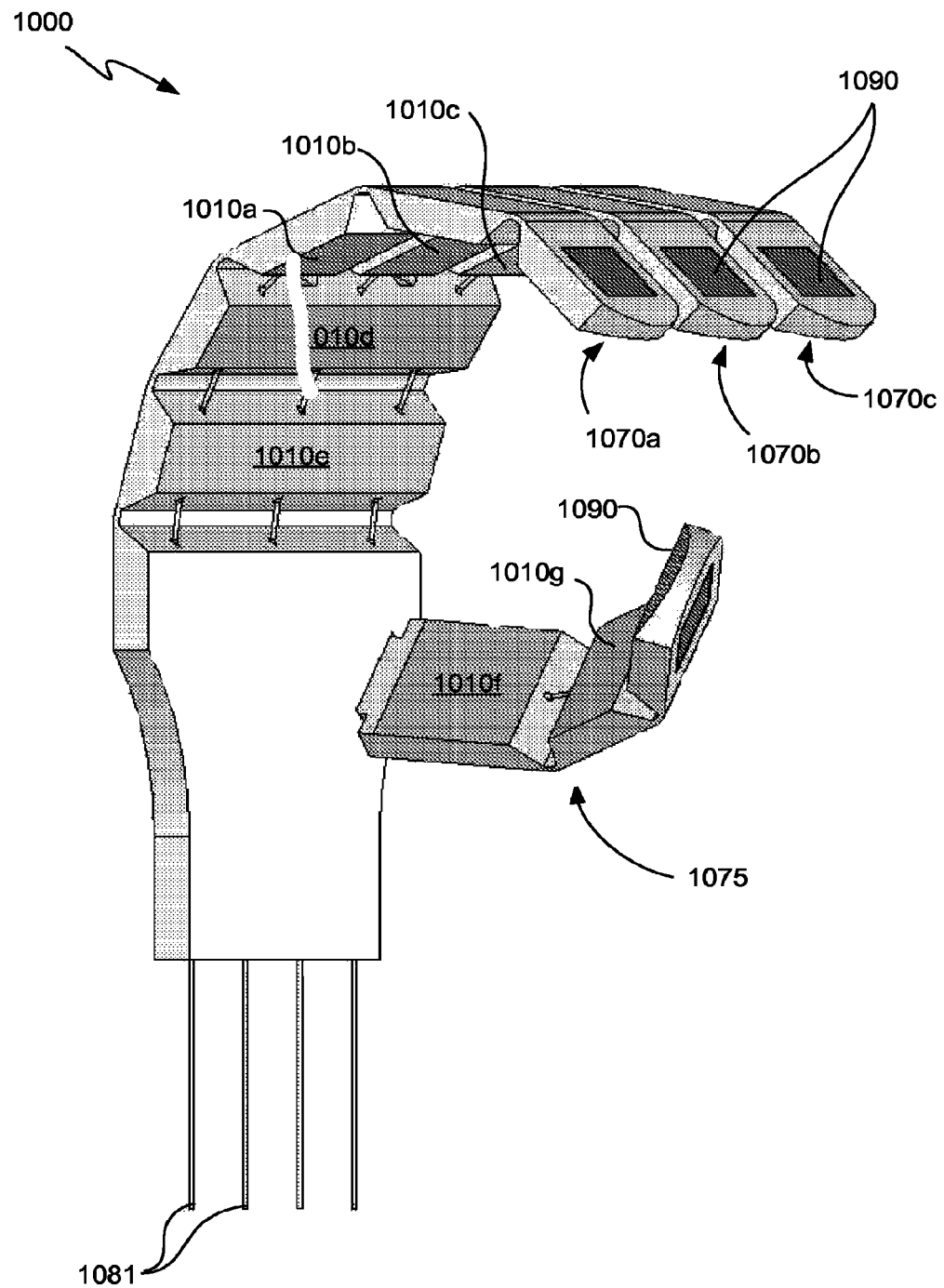
FIG. 10 illustrates in front perspective view an exemplary robotic hand having numerous fingers, electroadhesive gripping surfaces and cable actuators according to one embodiment of the present invention.

Although electroadhesive end effector 10 having electroadhesive gripping surface 11 of FIG. 1A is shown as having six electrodes 18, it will be understood that a given electroadhesive end effector or gripping surface can have just a single electrode. Furthermore, it will be readily appreciated that a given electroadhesive end effector can have a plurality of different electroadhesive gripping surfaces, with each separate electroadhesive gripping surface having at least one electrode and being adapted to be placed against or in close proximity to the foreign object to be gripped. Although the terms electroadhesive end effector, electroadhesive gripping unit and electroadhesive gripping surface are all used herein to designate electroadhesive components of interest, it will be understood that these various terms can be used interchangeably in various contexts. In particular, while a given "end effector" might comprise numerous distinct "gripping surfaces," these different gripping surfaces might also be considered separate end effectors themselves. While the robotic hand embodiment of FIG. 10 might be considered as one single end effector having numerous different gripping surfaces, for example, this robotic hand could also be considered as numerous different end effectors acting in concert.

Figure 2A:
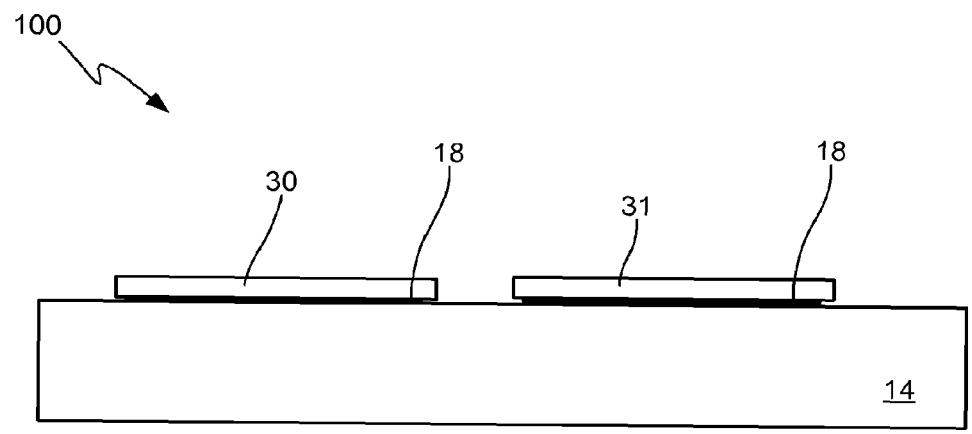
FIG. 2A illustrates in side cross-sectional view an exemplary pair of electroadhesive gripping surfaces or end effectors having single electrodes thereon according to one embodiment of the present invention.
Figure 2B:
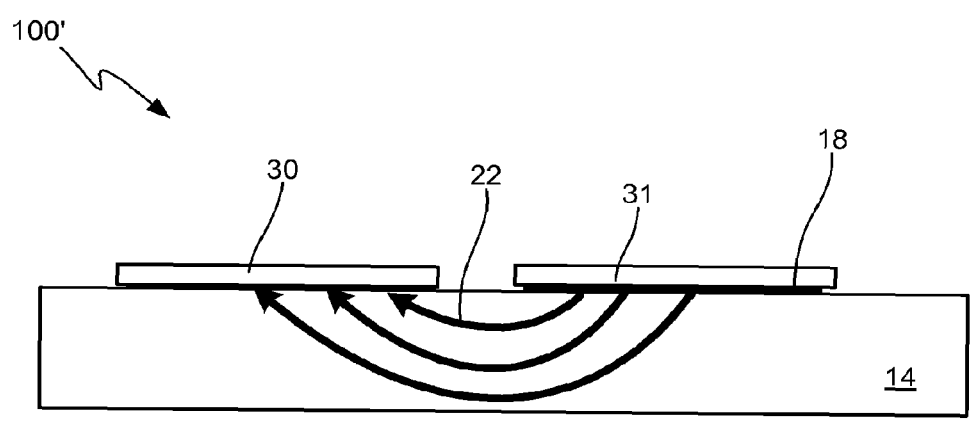
FIG. 2B illustrates in side cross-sectional view the exemplary pair of electroadhesive gripping surfaces or end effectors of FIG. 2A with voltage applied thereto according to one embodiment of the present invention.

Referring to FIGS. 2A and 2B, an exemplary pair of electroadhesive end effectors or gripping surfaces having single electrodes thereon is shown in side cross-sectional view. FIG. 2A depicts electroadhesive gripping system 100 having electroadhesive end effectors or gripping surfaces 30, 31 that are in contact with the surface of a foreign object 16, while FIG. 2B depicts activated electroadhesive gripping system 100' with the end effectors or gripping surfaces having voltage applied thereto. Electroadhesive gripping system 100 includes two electroadhesive end effectors or gripping surfaces 30, 31 that directly contact the foreign object 16. Each electroadhesive end effector or gripping surface 30, 31 has a single electrode 18 coupled thereto. In such cases, the electroadhesive gripping system can be designed to use the foreign object as an insulation material. When voltage is applied, an electric field 22 forms within foreign object 14, and an electrostatic force between the electroadhesive end effectors or gripping surfaces 30, 31 and the foreign object is created. Various embodiments that include numerous of these single electrode electroadhesive end effectors can be used, as will be readily appreciated.

Figure 3A:
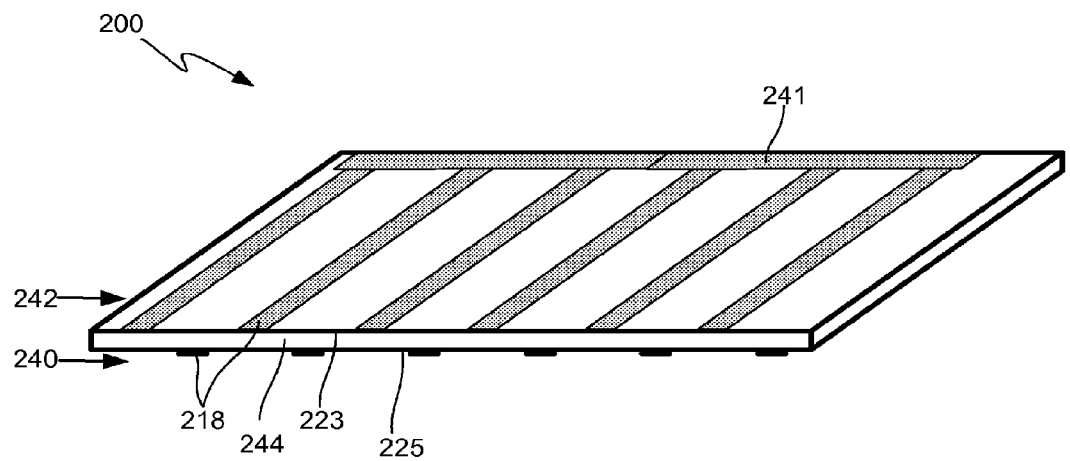
FIG. 3A illustrates in top perspective view an exemplary electroadhesive gripping surface in the form of a sheet with electrodes patterned on top and bottom surfaces thereof according to one embodiment of the present invention.
Figure 3B:
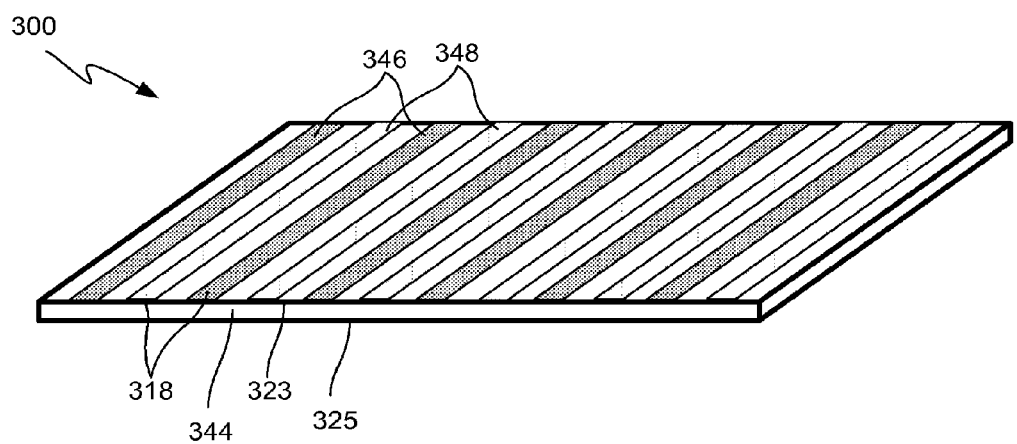
FIG. 3B illustrates in top perspective view an alternative exemplary electroadhesive gripping surface in the form of a sheet with electrodes patterned on a single surface thereof according to one embodiment of the present invention.

In some embodiments, an electroadhesive gripping surface can take the form of a flat panel or sheet having a plurality of electrodes thereon. In other embodiments, the gripping surface can take a fixed shape that is matched to the geometry of the foreign object most commonly lifted or handled. For example, a curved geometry can be used to match the geometry of a cylindrical paint can or soda can. The electrodes may be enhanced by various means, such as by being patterned on an adhesive device surface to improve electroadhesive performance, or by making them using soft or flexible materials to increase compliance and thus conformance to irregular surfaces on foreign objects. Turning next to FIGS. 3A and 3B, two examples of electroadhesive gripping surfaces in the form of flat panels or sheets with electrodes patterned on surfaces thereof are shown in top perspective view. FIG. 3A shows electroadhesive gripping surface 200 in the form of a sheet or flat panel with electrodes 218 patterned on top and bottom surfaces thereof. Top and bottom electrodes sets 240 and 242 are interdigitated on opposite sides of an insulating layer 244. In some cases, insulating layer 244 can be formed of a stiff or rigid material. In some cases, the electrodes as well as the insulating layer 244 may be compliant and composed of a polymer, such as an acrylic elastomer, to increase compliance. In one preferred embodiment the modulus of the polymer is below about 10 MPa and in another preferred embodiment it is more specifically below about 1 MPa. Various types of compliant electrodes suitable for use with the present invention are generally known, and examples are described in commonly owned U.S. Pat. No. 7,034,432, which is incorporated by reference herein in its entirety and for all purposes.

Electrode set 242 is disposed on a top surface 223 of insulating layer 244, and includes an array of linear patterned electrodes 218. A common electrode 241 electrically couples electrodes 218 in set 242 and permits electrical communication with all the electrodes 218 in set 242 using a single input lead to common electrode 241. Electrode set 240 is disposed on a bottom surface 225 of insulating layer 244, and includes a second array of linear patterned electrodes 218 that is laterally displaced from electrodes 218 on the top surface. Bottom electrode set 240 may also include a common electrode (not shown). Electrodes can be patterned on opposite sides of an insulating layer 244 to increase the ability of the electroadhesive end effector 200 to withstand higher voltage differences without being limited by breakdown in the air gap between the electrodes, as will be readily appreciated.

Alternatively, electrodes may also be patterned on the same surface of the insulating layer, such as that which is shown in FIG. 3B. As shown, electroadhesive gripping surface 300 comprises a sheet or flat panel with electrodes 318 patterned only on one surface thereof. Electroadhesive gripping surface 300 can be substantially similar to electroadhesive gripping surface 200 of FIG. 3A, except that electrodes sets 346 and 348 are interdigitated on the same surface 323 of a compliant insulating layer 344. No electrodes are located on the bottom surface 325 of insulating layer 344. This particular embodiment decreases the distance between the positive electrodes 318 in set 346 and negative electrodes 318 in set 348, and allows the placement of both sets of electrodes on the same surface of electroadhesive gripping surface 300. Functionally, this eliminates the spacing between the electrodes sets 346 and 348 due to insulating layer 344, as in embodiment 200. It also eliminates the gap between one set of electrodes (previously on bottom surface 125) and the foreign object surface when the top surface 323 adheres to the foreign object surface. Although either embodiment 200 or 300 can be used, these changes in the latter embodiment 300 do increase the electroadhesive forces between electroadhesive gripping surface 300 and the subject foreign object to be handled.

In some embodiments, an electroadhesive end effector or gripping surface may comprise a sheet or veil type grasper that is substantially flexible in nature. In such embodiments, either no backing structure or a substantially flexible backing structure can be used, such that all or a portion of the veil type end effector or gripping surface can substantially flex or otherwise conform to a foreign object or objects, as may be desired for a given application. Creating electroadhesive end effectors that facilitate such conforming or compliance to a foreign object can be achieved, for example, by forming the electroadhesive layer or gripping surface out of thin materials, by using foam or elastic materials, by butting out flaps or extensions from a primary electroadhesive sheet, or by applying the sheet only to a few selected underlying locations, rather than to an entire rigid backing, among other possibilities.

Although the foregoing exemplary embodiments for electroadhesive gripping surfaces in the form of flat panels or sheets depict bars or stripes for electrodes, it will be understood that any suitable pattern for electrodes could also be used for such a sheet-type electroadhesive gripping surface. For example, a sheet-type electroadhesive gripping surface could have electrodes in the form of discrete squares or circles that are distributed about the sheet and polarized in an appropriate manner, such as in an evenly spaced "polka-dot" style pattern. Other examples such as two sets of electrodes patterned as offset spirals, can also be used. As one particular example, where a thin and flexible material is used for the insulating layer, such as a polymer, and where electrodes are distributed thereabout in the form of discrete discs, a resulting flexible and compliant electroadhesive gripping surface "blanket" would be able to conform to the irregular surfaces of a relatively large object while providing numerous different and discrete electroadhesive forces thereto during voltage application.

Penetration Depth Tuning

Fine control of the amount of voltage to the electrodes in a given single or set of electroadhesive end effectors can significantly affect the handling of foreign objects thereby. Varying the voltage to the electrodes results in varying the applied electrostatic or electroadhesive force between an electroadhesive end effector and an object to be handled. Such variances in the overall electroadhesive force applied to a foreign object can result in certain beneficial results, such as only a portion of the object being lifted, held or moved. A simple example of varying the amount of voltage to electroadhesive end effector electrodes to affect a result can involve flat panel or sheet-type end effectors used to pick up a stack of paper. Variances in the electroadhesive force can also be used to controllably slide objects relative to the end effector. Such controlled sliding is especially useful when repositioning objects within a grip such as repositioning a pen within a grip, or rotating a cuboid shaped object inside a robotic hand.

Figure 4A:
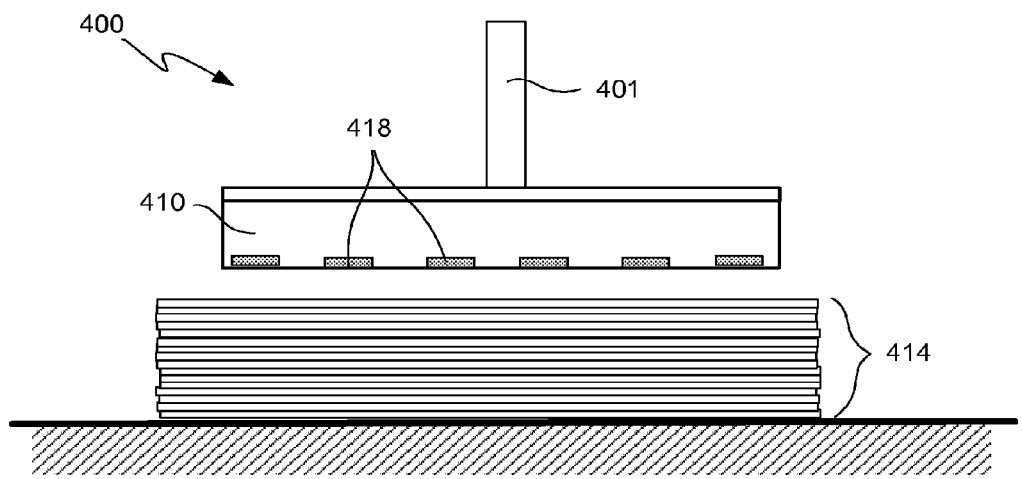
FIG. 4A illustrates in side elevated view an exemplary flat electroadhesive end effector adapted to utilize a variable voltage according to one embodiment of the present invention.
Figure 4B:
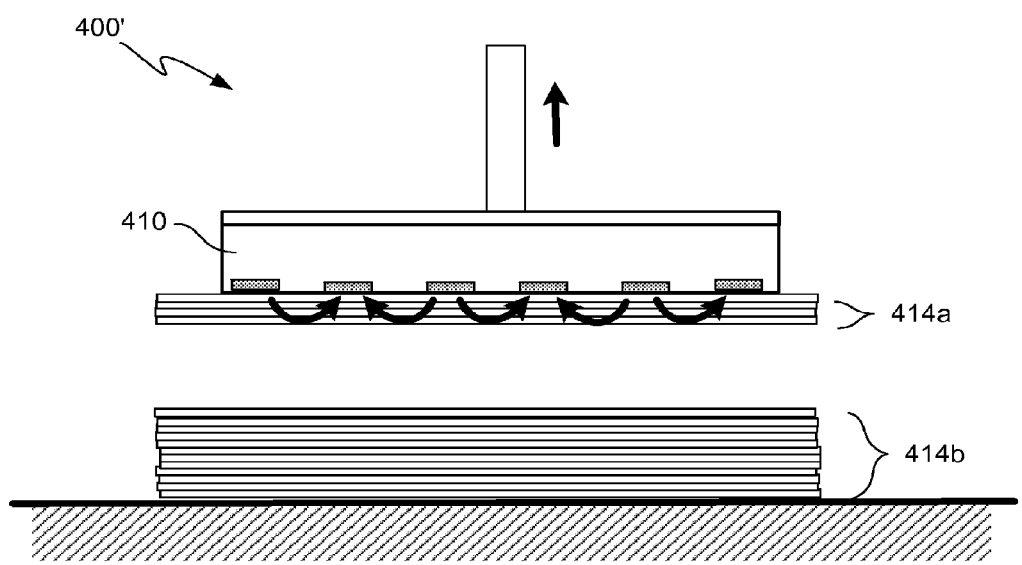
FIG. 4B illustrates in side elevated view the exemplary electroadhesive end effector of FIG. 4A having a tuned applied voltage and picking up only a portion of a foreign object according to one embodiment of the present invention.

Continuing with FIGS. 4A and 4B, an exemplary flat electroadhesive end effector adapted to utilize a variable voltage according to one embodiment of the present invention in illustrated in side elevated view. Electroadhesive gripping system 400 includes a flat electroadhesive end effector 410 having a plurality of electrodes 418 disposed on at least one gripping surface thereof, as well as a handle 401, bar or other tool that enables the manipulation of the end effector by a user or machine. Electroadhesive end effector 410 can include, for example, one of the flat panel or sheet-type electroadhesive gripping surfaces 200, 300 described above, although other variations for an end effector are also certainly possible. A stack of paper 414 represents the object to be handled by electroadhesive gripping system 400.

From its position in FIG. 4A, electroadhesive end effector 410 is lowered onto the stack of paper 414 and voltage is applied to the end effector. Once the appropriate level of voltage is applied and maintained, the electroadhesive end effector 410 is then lifted, as shown in modified electroadhesive gripping system 400' in FIG. 4B. Stack of paper 414 is then separated into two parts, lifted portion 414a and remaining portion 414b. As shown, lifted stack of paper 414a includes exactly four sheets of paper, while the remaining sheets are not lifted. The number of sheets that are lifted is dependent upon the "penetration depth" of the electroadhesive force, which is related to a number of factors.

Again, such factors can include applied voltage, the amount of surface area contact, electroadhesive end effector size, electrode material conductivity and spacing, insulating material composition, foreign object material composition, gap distance between electrodes and the foreign object, and the presence of dust, moisture or other disturbances to electroadhesion, among others. Of all such factors though, the amount of applied voltage is one that is particularly controllable. As such, the amount of voltage that is applied to electrodes 418 can be varied or precisely "tuned" such that a desired exact number of sheets of paper are lifted.

In the example of FIGS. 4A and 4B, when no voltage is applied to the electrodes 418, then electroadhesive end effector 410 does not pick up or manipulate any of the paper stack 414. When a low voltage (V1) is applied to the electroadhesive end effector 410, then exactly one sheet of paper can be reliably picked up or moved around from the stack of paper 414. When a slightly higher voltage (V2) is applied, then exactly two sheets of paper can be similarly manipulated. When an even higher voltage is applied (V3), even more sheets can be picked up, such as the four sheets 414a shown in FIG. 4B. Further variations in the applied voltage can then be used to pick up different amounts of paper sheets.

Potential enhancements can include using such electroadhesion along with an active circuit that tunes the voltage, while simultaneously measuring capacitance to determine the actual number of sheets of paper that are coupled to the electroadhesive end effector. Rise time for the voltage can also be monitored as an indirect measure of capacitance, and the voltage can be tuned accordingly. Other measures to measure or quantify number of sheets lifted, such as mechanical thickness of the stack that is picked up, can also be used in a feedback loop to control the electroadhesive voltage.

Potential uses can include the handling of paper in printers, copiers, facsimile machines and the like, and even in industrial paper handling equipment, such as ATM machines or other machines handling bills or notes. Other applications can include handling sheets of laminates, such as for countertops, for example. One of skill in the art will readily appreciate the extrapolation of this concept to other more complex foreign objects, such that under one voltage an entire foreign object can be lifted, moved or otherwise manipulated, while under another lower voltage only a part or component of that foreign object is similarly moved or manipulated. Lowering the voltage in one part of a given electroadhesive gripping surface or end effector while maintaining higher voltage in another part also allows pivoting or repositioning the object within the grasp without requiring very fin control of the mechanical position and forces applied to the object.

Peeling Resistance

One drawback to the use of electroadhesion, such as that which is set forth in the foregoing examples, is the tendency for a peeling or falling away effect at the edges of the contact surface areas where an electroadhesive end effector or gripping surface and foreign object or substrate meet. In some cases, the gripping surface can utilize a property of lower electroadhesive peel forces, especially during the release of an object after relocating or reorienting it to a new position to enhance the speed of release or to ensure complete detachment of the object. In many other cases, however, the lower peeling force is an important design consideration for optimal performance of the end effector or gripping surface. This can be particularly true for instances where objects extend and have significant weight beyond the edges of the electroadhesive end effector or gripping surface, such as in the foregoing paper lifting example of FIGS. 4A and 4B. Various modifications and techniques can be used to counteract or diminish such peeling effects.

Figure 5A:
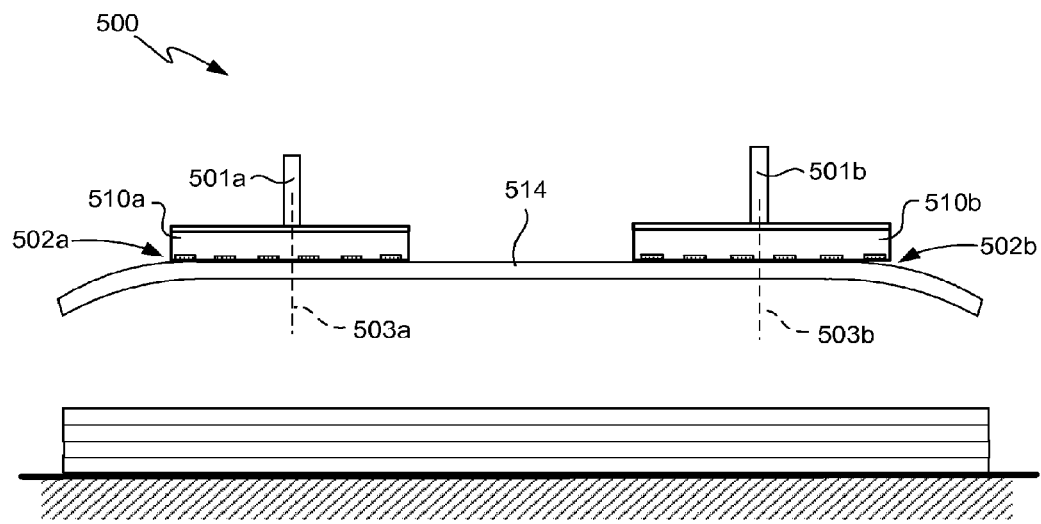
FIG. 5A illustrates in side elevated view an exemplary electroadhesive gripping system having two electroadhesive gripping surfaces suitable for lifting thin and flexible foreign objects according to one embodiment of the present invention.

Turning now to FIG. 5A, an exemplary electroadhesive gripping system having two electroadhesive gripping surfaces suitable for lifting flexible foreign objects is shown in side elevated view. Electroadhesive gripping system 500 includes two electroadhesive end effectors or gripping surfaces 510a, 510b arranged at a distance with respect to each other, and each having its own separate handle 501a, 501b or other device to facilitate lifting or handling. This arrangement generally means that the different "a" and "b" items belong to different electroadhesive end effectors, as will be readily appreciated. Such an arrangement can enable the system 500 to lift or handle relatively large objects or materials, such as large sheets of paper, fabric, prepreg or the like. For purposes of illustration, system 500 can be arranged to lift and move a sheet of prepreg material 514 from a stack of such materials. The weight of such a material, particular at its outer edges, can cause a peeling effect.

Under regular use, both electroadhesive end effectors (or gripping surfaces) 510a, 510b are lowered to contact the surface of sheet 514. That is, a first electroadhesive end effector 501a contacts a first surface region of sheet or other foreign object 514 such that a first line 503a normal to a first surface of contact between the first electroadhesive end effector 501a and the sheet 514 is created. Similarly, a second electroadhesive end effector 501b contacts a second separate surface region of sheet 514 such that a second line 503b normal to a second surface of contact between the second electroadhesive end effector 501b and the sheet 514 is created. Under regular use, such as where the stack of sheets produces a relatively flat upper surface, this results in a placement of electroadhesive end effectors such that the first normal line 503a and the second normal line 503b are substantially parallel in nature, as shown in FIG. 5A. Alternatively, it can be considered that the first and second surfaces of contact lie substantially within the same plane.

As noted, one possible undesirable result from such an arrangement is that sheet 514 can tend to peel away from the edges of the end effectors. For example, while there is little to no peeling or gap 502a at the outer edge of electroadhesive end effector 510a, the other electroadhesive end effector 510b may experience some peeling at its outer edge, such as that seen at gap 502b. Of course, some instances may involve peeling at both edges, other instance may involve peeling at the inner edges of each end effector as well, while still others may involve no peeling at all. In any event, such peeling is undesirable, since the resulting reduction in force at the precise location where the surfaces of both objects diverge may lead to the precipitation of even further peeling. In some instances, the entire foreign object may be peeled away from the electroadhesive end effector once peeling starts.

Figure 5B:
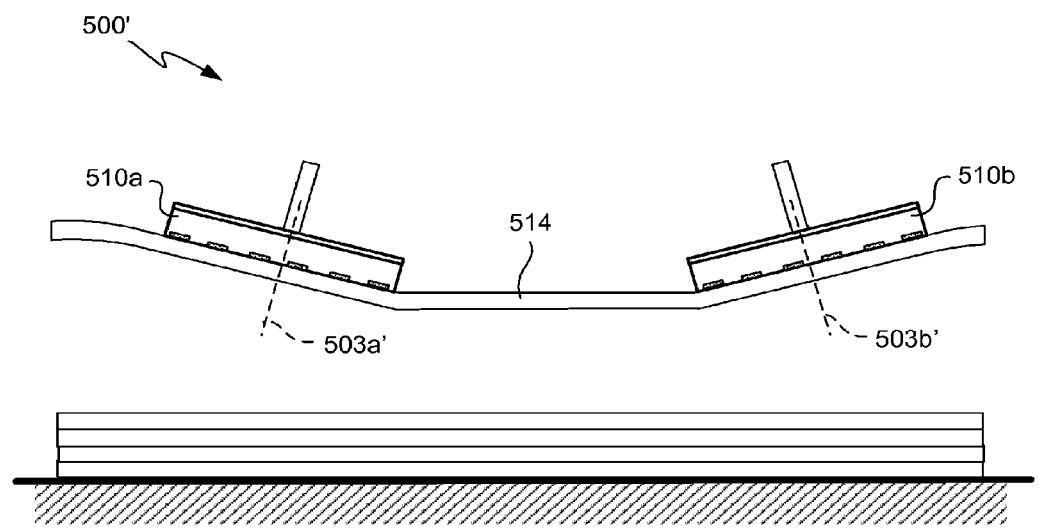
FIG. 5B illustrates in side elevated view the exemplary electroadhesive gripping system of FIG. 5A having its two electroadhesive gripping surfaces rotated at an angle to minimize peeling according to one embodiment of the present invention.

One technique for dealing with peeling is to rotate the electroadhesive end effectors or gripping surfaces. FIG. 5B illustrates in side elevated view the exemplary electroadhesive gripping system of FIG. 5A having its two electroadhesive end effectors or gripping surfaces rotated at an angle so as to minimize peeling. In modified electroadhesive gripping system 500', both electroadhesive end effectors 510a, 510b have been rotated outward somewhat, such that the normal lines 503a', 503b' are no longer parallel to each other. Alternatively, it can be considered that the first and second surfaces of contact do not lie substantially within the same plane. Although the amount of rotation on each end effector is definitely noticeable as shown, it is also contemplated that such an amount of rotation can be lessened without losing the benefits of such an arrangement. By rotating the electroadhesive end effectors such that their respective normal lines are no longer parallel (or surfaces of contact do not lie within the same plane), the relatively flexible material of sheet 514 can be pulled taut or otherwise have any slack therein reduced. This in turn reduces the tendency of the material to peel away from the edges of the electroadhesive end effectors, particularly at the inside edges.

Another technique that can be used to combat peeling is to vary the voltages to different electrodes, in the event that each electroadhesive end effector has a plurality of electrodes. Under such an arrangement, more voltage can be delivered to the outer electrodes near the outer edge of an electroadhesive end effector (i.e., near gaps 502a and 502b), than is delivered to other electrodes. This arrangement can be particularly beneficial where a finely tuned voltage is being used to pick up an exact number of sheets, but peeling of the sheets away from the outer edges of the end effectors is to be eliminated or minimized.

Yet another technique is to vary the distance or tension between the gripping surfaces, such that a mechanical force is applied to keep the sheet 514 taut and minimize droop or peeling forces. Other techniques to mitigate peeling forces include the addition of geometrical features to the electroadhesive gripping surface of one or more end effectors 502a and 502b. Such geometrical features may include cutting flaps out of the electroadhesive gripping surface, or the addition of fibers or hair-like structures to the electroadhesive gripping surface.

Gripping

Although the foregoing examples have been limited to foreign objects having flat surfaces, particularly thin sheets and the like, a wide variety of different foreign objects can be gripped and handled through the use of such electroadhesive end effectors. In particular, the strategic use of multiple electroadhesive end effectors can overcome many of the drawbacks associated with traditional mechanical pick and place processes, such as for robotics or other manufacturing applications.

Moving to FIG. 6A, an exemplary spherical or cylindrical foreign object being gripped by traditional mechanically gripping actuators is illustrated in top plan view. Mechanical gripping system 600 includes four mechanical gripping actuators or components 605a, 605b, 605c, 605d placed at various different surface locations of foreign object 614. Because mechanical "crushing" forces are used to grip and handle the foreign object 614, it is typical for the various actuators 605 to be located on opposite sides of the object from each other. In order for the object 614 to be gripped and handled, each actuator exerts a significant mechanical crushing or squeezing force, 606a, 606b, 606c, 606d on the object. These mechanical forces 606 are preferably sufficient to overcome the weight of the object, and each mechanical force component needs an opposing force component on an opposing side of the object in order to adequately grip the object. This traditional mechanical gripping process can be disturbed or discouraged by numerous factors, including a dirty or wet object, surface irregularities, a fragile or delicate object, or an inability to locate adequately the mechanical actuators on opposing sides of the object to effectively balance the forces, among others.

FIG. 6B illustrates in top plan view the foreign object of FIG. 6A being gripped by two electroadhesive gripping surfaces according to one embodiment of the present invention. Electroadhesive gripping system 650 includes just two actuators in the form of electroadhesive gripping surfaces 610a, 610b, which can be placed at a variety of locations about the surface of foreign object 614. In significant contrast to mechanical gripping system 600, the electroadhesive gripping surfaces 610a, 610b do not need to oppose each other in magnitude or be on opposite sides of the object 614. This is primarily because electroadhesive forces are used rather than mechanical crushing forces to grip the object. As such, the force exerted by one electroadhesive gripping surface on the foreign object does not need to be countered by an opposing force on the opposite side of the object. As shown, electroadhesive gripping surfaces can be placed at a 90 degree angle with respect to each other about the surface of object 614, for example. A wide variety of relative locations and placements can also be used, as will be readily appreciated. Such freedom in actuator placement is a substantial advantage over traditional mechanical systems.

Another significant difference between mechanical gripping system 600 and electroadhesive gripping system 650 is that less overall force is needed to grip and handle the foreign object 614 in an electroadhesive system. While mechanical crushing or pinching forces need to oppose each other, such as force 606a opposite force 606d and force 606b opposite force 606c in the mechanical gripping system 600, no such opposing mechanical force components are needed for electroadhesive forces 613a and 613b in the electroadhesive gripping system 650.

Referring to FIGS. 7A-7D, various force diagrams with respect to an exemplary cylindrical foreign object demonstrate the differences in applied forces between a traditional mechanical gripping system and the inventive electroadhesive gripping system disclosed herein. Starting with FIG. 7A, an exemplary force diagram for a foreign object being gripped by traditional mechanically gripping actuators is shown in side perspective view. Mechanical gripping system 700 must overcome or offset the weight W of foreign object 714 in order to handle the object. For purposes of illustration, three incumbent mechanical forces 706a, 706b, 706c representing forces from three mechanically gripping actuators are shown. It will be readily appreciated that more mechanical actuators could be used, or alternatively, that exactly two diametrically opposing mechanical actuators could be used.

Each of incumbent mechanical forces 706a, 706b, 706c imparts an upward frictional force against their respective surface areas of foreign object 714, which upward frictional forces are naturally a fraction of the directly imparted crushing forces. These frictional forces are dependent upon a coefficient of friction "f," and are represented as $f*706(x)$. For the weight of the object 714 to be overcome by mechanical gripping system 700, the sum of $(f*706a)+(f*706b)+(f*706c)$ must be greater than W. Of course, the coefficient of friction f can vary widely depending upon the textures and conditions of the contacting surfaces. Where an object is relatively slippery, this coefficient f is small, which then results in the need for even greater incumbent forces to overcome the object weight. This results in mechanical forces 706a, 706b, 706c that can be relatively large.

FIG. 7B illustrates in top plan view the exemplary force diagram for the foreign object of FIG. 7A. Again, the sum of all incumbent mechanical forces 706a, 706b, 706c in the x and y directions against foreign object 714 must be zero for the object to be mechanically gripped, which is why these forces are primarily "crushing" forces. As shown, force 706a lies completely in the x direction, such that the sum of x direction components of forces 706b and 706c must offset force 706a. Because force 706a has no y direction component in the figure as shown, the y direction components for forces 706b and 706c must offset each other. Other arrangements with more or fewer mechanical actuators in varying directions may be used, although the final result should require a zero sum of incumbent mechanical forces in the x and y directions. Because such a zero sum force is needed, the positioning of mechanical actuators can be particularly critical. Even a slight offset or misplacement of one mechanical gripping actuator or "finger" can result in a non-zero sum force between actuators, such that the part or object is dropped or otherwise mishandled.

In contrast, FIG. 7C illustrates an exemplary force diagram for a foreign object being gripped by electroadhesive gripping surfaces according to one embodiment of the present invention, similarly in side perspective view. Similar to the mechanical gripping system above, electroadhesive gripping system 750 must overcome or offset the weight W of foreign object 714 in order to handle the object. Unlike the mechanical gripping system, however, this electroadhesive gripping system 750 does not rely on mechanical crushing or pinching forces, such that precise positioning or offsetting of actuators is not necessary. Rather, system 750 uses a plurality of electroadhesive forces 713a, 713b, 713c to grip and handle foreign object 714 using electroadhesive gripping surfaces.

Each of electroadhesive forces 713a, 713b, 713c results in an upward anti-slip force Px (obtained by multiplying friction coefficient f with the electroadhesive normal forces) against their respective surface areas of foreign object 714. For the weight of the object 714 to be overcome by electroadhesive gripping system 750, the sum of Pa+Pb+Pc must be greater than W. Of course, the amount of pressure force exerted upward on foreign object 714 is related to numerous factors, including the magnitude of electroadhesive force in particular. It is worth noting, however, that the amount of electroadhesive forces needed to support the weight W of foreign object 714 is substantially less than the amount of mechanical pinching force to support the same object and weight.

FIG. 7D illustrates in top plan view the exemplary force diagram for the foreign object of FIG. 7C. To the extent that any nominal mechanical crushing force is used by the applied electroadhesive end effectors or gripping surfaces, such relatively small mechanical forces must arrive at a zero sum in the x and y directions, similar to that which is set forth above for mechanical gripping system 700. It is worth noting, however, that in many cases, the electroadhesive forces are sufficient to hold the entire weight of the object with no mechanical crushing forces, which supports the object weight in the z-direction, but removes the need for force balancing in x and y directions.

Numerous drawbacks and issues experienced in conventional mechanical gripping systems, such as system 700, are overcome or minimized when using an electroadhesive gripping system, such as system 750. For example, a conventional mechanical gripping system typically requires intensive sensing and control in order to grip objects reliably without damaging them. Such mechanical gripping systems also tend to require relatively large actuators that are sized for the highest expected gripping forces. These large actuators need to be both precise and powerful in order to be able to handle delicate objects without slipping or damaging the objects. These requirements tend to result in larger actuators, which in turn results in heavy grippers, which then results in higher weights in upstream actuators, all of which impacts the overall weight and energy usage of the entire robot or system.

In contrast, an electroadhesive gripping system does not require a "closed chain placement" or offsetting of actuators, end effectors or gripping surfaces, such that precise positioning to offset for pinching forces is not required. Intensive sensing and control for such precise positioning is thus not needed. Because the anti-slip forces needed to support the weight of handled objects comes from electroadhesive forces rather than pinching forces, actuators or electroadhesive gripping surfaces can be sized for position control with respect to expected tasks. The relaxed size, actuation and position control requirements for such an electroadhesive gripping system can result in a tenfold savings in weight and energy consumption while still providing more reliable gripping and handling of the same foreign objects.

For purposes of comparison, a commercial off the shelf humanoid mechanical gripper weighing about 2 kg can have a typical gripping or pinching force of about 5-10 N and corresponding torques of about 0.5-1 Nm. The energy required to lift the mechanical actuators 1 meter is about 20 J. In contrast, equal adhesion forces can be delivered by electroadhesive end effectors having electroadhesive pads or gripping surfaces with effective areas of about 2 cm by 5 cm. The electroadhesive pads and associated power supply for such a device could weigh as little as 30 g. Since the overall end effectors need only be designed for position control, the overall weight of the electroadhesive end effectors can be under 200 g. Thus, the energy required to lift these components by the same height is ¹⁄₁₀ the energy required for a conventional mechanical gripping system. Of course, the energy gain from weight savings for downstream actuators and components would be even greater.

Exemplary Applications

Figure 8:
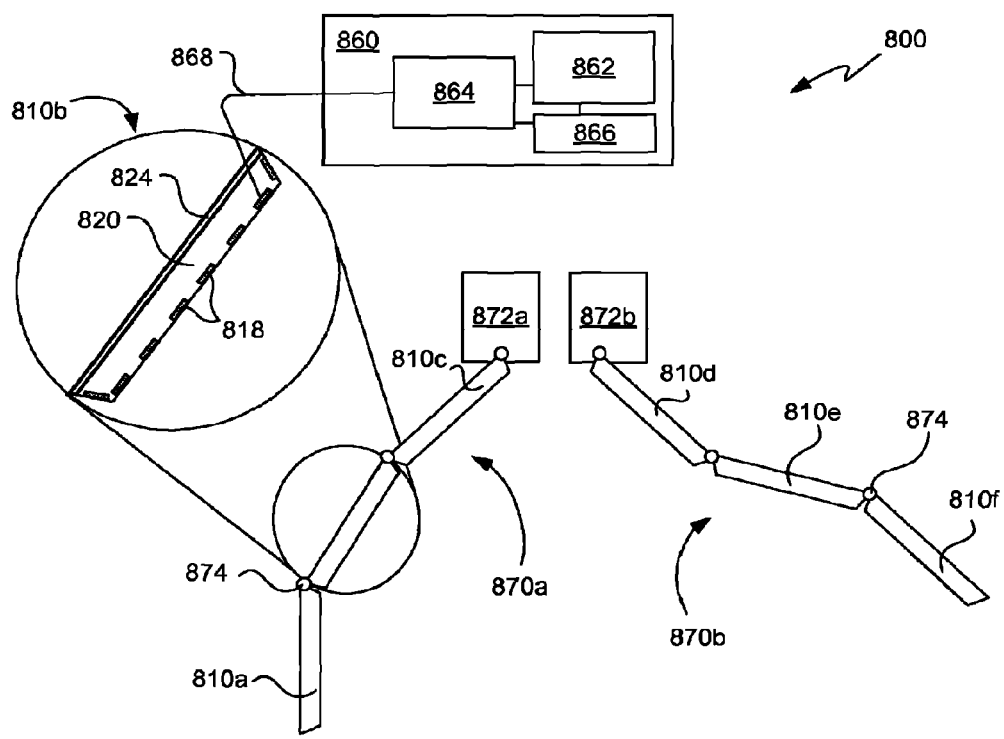
FIG. 8 illustrates in side elevated view an exemplary electroadhesive gripping system having multiple fingers, each having a plurality of electroadhesive gripping surfaces thereupon, along with an exemplary set of control circuitry according to one embodiment of the present invention.

The ability to freely move and position gripping actuators in the form of electroadhesive end effectors with respect to a handled foreign object opens up many new possibilities and designs for object handling. Turning next to FIG. 8, an exemplary electroadhesive gripping system having multiple electroadhesive gripping surface lined fingers and associated control circuitry is shown in side elevated view. Electroadhesive gripping system 800 includes a first finger 870a and a second finger 870b, with each finger having a plurality of segments that are configured to move with respect to each other. While first finger 870a includes segments 810a, 810b and 810c, second finger 870b includes segments 810d, 810e and 810f. Although only two fingers 870a, 870b have been shown for purposes of illustration, it will be understood that any number of additional fingers may also be used. Each finger 870a, 870b can extend from a base robot or machine component, such as base components 872a and 872b respectively. It will be appreciated that a wide variety of well known robotic and machine applications can apply to such base components 872a, 872b and the robotic or machine components behind them, and such details involving these components and upstream thereof are not of special focus here.

A finger segment 810x can have one or more electroadhesive gripping surfaces situated thereon. For purposes of illustration, however, just one electroadhesive gripping surface has been included with each finger segment. In fact, a magnified view of finger segment 810b is provided, wherein it is clear that a single electroadhesive gripping surface is included therein. Similar to the original embodiment 10 from FIG. 1A, finger segment 810b includes a structural backing 824 and an insulating material 820 around a plurality of electrodes 818 located at a front gripping surface thereof. In this embodiment, as in each of the above embodiments, each electroadhesive end effector can rely on electrical control and input.

At the very least, a minimum amount of circuitry is needed to provide electrostatic adhesion voltages to an electroadhesive gripping surface, such as, for example, a control and conditioning circuitry 860 suitable for providing an appropriate electrostatic adhesion voltage to electrodes 818 of electroadhesive gripping surface 810b. Such voltages can be provided, for example, by a conductive connector 868 between the control and conditioning circuitry and a common or connecting back electrode (not shown) on the electroadhesive gripping surface 810b. Control circuitry 862 can be configured to determine when a suitable electrostatic adhesion voltage is applied to electrodes 818. Control circuitry 862 may include a processor or controller that provides on/off signals that determine when electrostatic adhesion voltages are applied, and what magnitudes. Control circuitry 862 may also determine the times and timing associated with a charge and discharge cycle on the electroadhesive end effector 810b.

Conditioning circuitry 864 may include any circuitry configured to perform one or more of the following tasks: voltage step-up, which is used when applying a voltage to the electrodes 818, conversion between AC and DC power, voltage smoothing, and recovery of stored electrostatic energy. Conditioning circuitry 864 may be designed to receive power from a low-voltage battery 866, for example, or another suitable power source. For example, in robotics applications, conditioning circuitry 864 may receive a voltage from a conventional battery, such as those less than 40 volts, and increase the voltage to an electrostatic adhesion voltage above 1 kilovolt. The low voltage power source such as the battery may be replaced by another electrical source such as a set of small photovoltaic panels similar to the ones used in many handheld calculators. In one embodiment, conditioning circuitry 864 includes a transformer configured to provide voltage step-up to electrostatic adhesion voltages described herein. More complex charge control circuits may be developed, as will be readily appreciated, and are not limited to the shown design. Also, some of the circuit functions may be integrated. For instance, one integrated circuit may perform the functions of both the step-up circuitry 864 and the charge control circuitry 862. A separate set of circuitry can be included for each electroadhesive end effector, or a common set of circuitry could be used to control multiple or all electroadhesive end effectors, as may be desired.

Electroadhesive gripping surfaces 810x can be coupled to each other and/or a base robot or other machine mechanically by hinges 874 or other suitable coupling devices. In some embodiments, a flexible support backing or skin (not shown) can be used to couple the various electroadhesive gripping surfaces, either in addition to or in place of hinges 874. Such a flexible support backing coupler can be, for example, a polymer such as an acrylic elastomer or foam. Such a polymer can be a compliant electroactive polymer adapted to aid in the positioning of the gripping surfaces or end effectors, with examples again being described in commonly owned U.S. Pat. No. 7,034,432, as referenced above and incorporated herein. Other actuating devices, such as a cable actuator, suitable for positioning and/or supporting the various electroadhesive gripping surfaces are discussed further below.

The use of multiple continuous fingers 870a, 870b, each having a plurality of electroadhesive gripping surfaces 810x that can be moved with respect to each other, takes advantage of the noted ability to freely move and position gripping actuators in the form of electroadhesive gripping surfaces with respect to a handled foreign object. Although only two fingers having three segments each are shown for purposes of illustration, it will be understood that further fingers and/or more segments per finger can be used, as well as additional modes of freedom for each segment with respect to any neighboring segments. In short, any and all suitable robotic embodiments that enable the placement of electroadhesive end effectors or gripping surfaces anywhere about any surface of a foreign object to be handled are contemplated. Various specific examples of three segment two finger arrangements will now be provided, although such examples are not intended to be limiting.

Figure 9A:
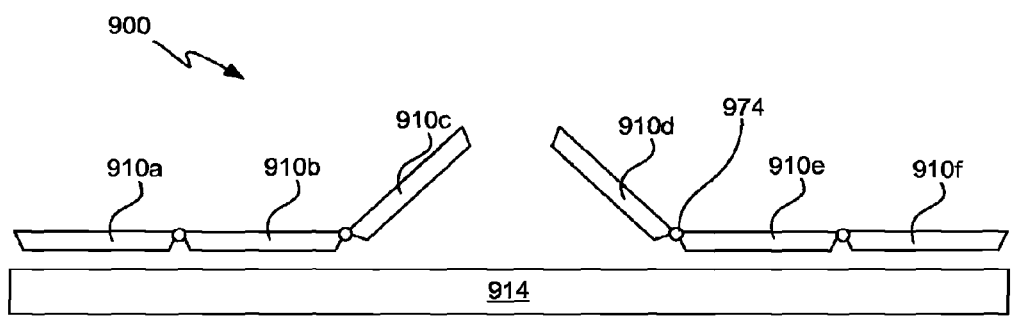
FIG. 9A illustrates in side elevated view the exemplary electroadhesive gripping system of FIG. 8 as applied to a foreign object having a large flat surface according to one embodiment of the present invention.

Continuing to FIG. 9A, one exemplary arrangement of the two fingers of the electroadhesive gripping system of FIG. 8 as applied to a foreign object having a large flat surface is shown in side elevated view. Electroadhesive gripping system 900 includes numerous components, such as those set forth in FIG. 8, although only the finger segments are shown here for purposes of simplicity. Each of finger segments or electroadhesive gripping surfaces 910a, 910b, 910c, 910d, 910e, 910f, as well as the various hinges or connectors 974 can be identical or substantially similar to the respective electroadhesive gripping surfaces 810× from foregoing gripping system 800. In this particular configuration, a plurality of electroadhesive gripping surfaces 910a, 910b, 910e, 910f from both fingers have been placed up against flat foreign object 914. In some embodiments, gripping surfaces 910c, 910d do not have enough freedom of movement with respect to any applicable base robotic components to which they are coupled, while in other embodiments (not shown), these gripping surfaces can also be placed up against foreign object 914. Once all appropriate electroadhesive gripping surfaces 910x have been placed up against foreign object 914, then voltage can be applied and the foreign object can be lifted or otherwise handled thereby. Alternatively, voltage can be applied early and maintained while the various gripping surfaces remain in contact with the foreign object.

Figure 9B:
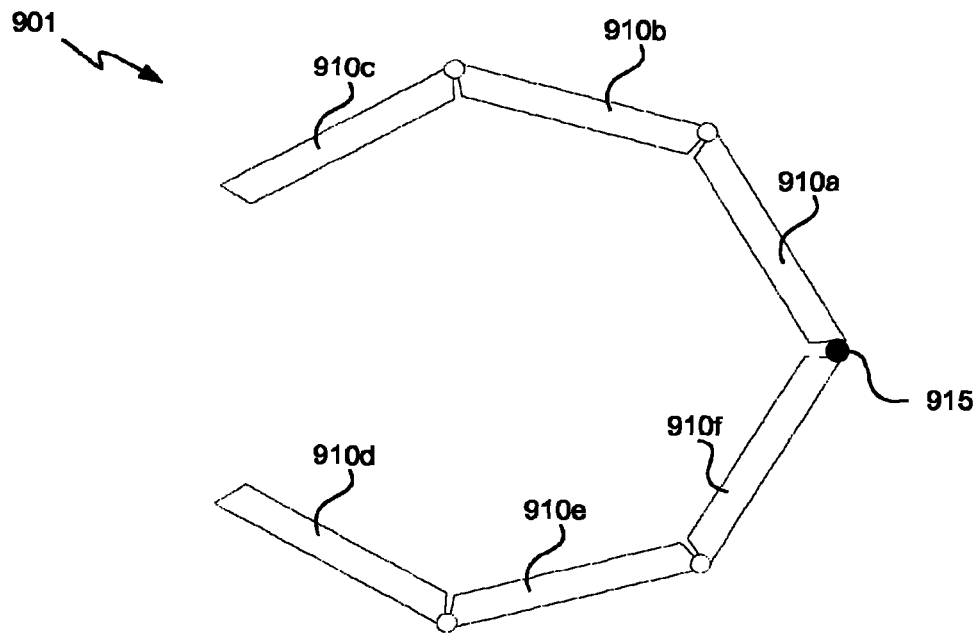
FIG. 9B illustrates in side elevated view the exemplary electroadhesive gripping system of FIG. 8 as applied to a foreign object comprising a small pin according to one embodiment of the present invention.

Another configuration example is shown in FIG. 9B, which illustrates the same electroadhesive gripping system as applied to a foreign object comprising a small pin. Electroadhesive gripping system configuration 901 includes the same two fingers having three segments or electroadhesive gripping surfaces each. In particular, electroadhesive gripping surfaces 910c and 910d are coupled to base robotic components (not shown), while electroadhesive gripping surfaces 910a and 910f represent the last end effectors at the tips of both fingers. As shown, the fingers and gripping surfaces have been arranged such that pin 915 can be suitably gripped. Such a gripping can be accomplished by using one or more of the smaller side surfaces of one or more electroadhesive gripping surfaces, as shown.

Figure 9C:
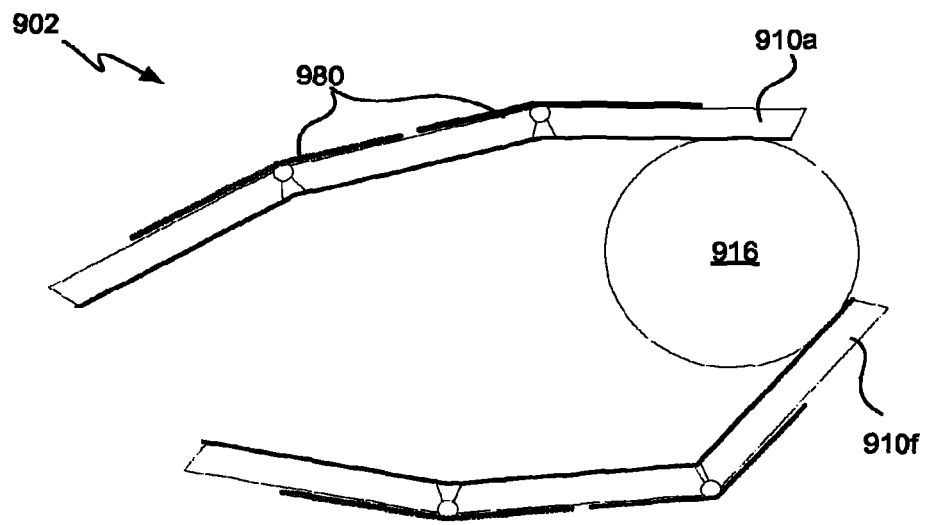
FIG. 9C illustrates in top plan view the exemplary electroadhesive gripping system of FIG. 8 as applied to a foreign object comprising a medium sized ball according to one embodiment of the present invention.

Still another configuration example is shown in FIG. 9C, which illustrates the same electroadhesive gripping system in top plan view applied to a foreign object comprising a medium sized ball. Electroadhesive gripping system configuration 902 again includes the same two fingers having three segments or electroadhesive gripping surfaces each, with electroadhesive gripping surfaces 910a and 910f again representing the last end effectors at the tips of both fingers. As shown, the fingers and gripping surfaces have been arranged such that ball 916 can be suitably gripped. Such a gripping can be accomplished by using just the fingertip electroadhesive gripping surfaces 910a and 910f, as shown, again due to the relative small size of the object. It will be understood that more or all of the electroadhesive gripping surfaces could be applied in the event that a larger foreign object is to be handled, or if the additional simplicity of a lower powered "all on or all off" system is desired.

Electroadhesive gripping system 902 also introduces multiple actuating components 980 that are configured to position the various electroadhesive gripping surfaces 910x with respect to each other. Such actuating components can include, for example, a cable driven by an actuator, an electromagnetic motor, a stepper motor, a hydraulic system, a pneumatic system, a shape memory alloy, and an electroactive polymer, among other possibilities. As shown in FIG. 9C, a thin layer across the back of adjacent electroadhesive gripping surfaces can be an electroactive polymer that is adapted to flex and thereby move or position the gripping surfaces when a suitable voltage is applied thereto.

As can be seen in at least electroadhesive gripping system configuration 902, the normal lines to the surface of foreign object 916 created by the surfaces of contact between the electroadhesive gripping surfaces 910a, 910f are clearly not substantially parallel with respect to each other. In fact, the same contact surfaces made by the gripping actuator components (i.e., gripping surfaces) against ball 916 simply could not be used by a traditional mechanically pinching gripping system. This flexibility in actuator or electroadhesive gripping surface placement is beneficial not only in terms of convenience, but again also because of the weight and cost savings considerations noted above.

An alternative actuating component arrangement can include the use of interlocking meta-materials. Such meta-materials can similarly be located across the backs or other suitable locations of each electroadhesive gripping surface, and can be used alone or in conjunction with one or more additional actuating components to help position the various gripping surfaces before the electroadhesion voltages are applied thereto. In the case of the meta-materials, an initial flexible uncharged state allows for the relatively free movement of adjacent components, while a subsequent charged or stiffened state substantially prevents or restricts relative movement of the same adjacent components. Further details regarding such meta-materials and various applications thereof can be found at, for example, commonly owned U.S. Pat. Nos. 7,598,691 and 7,598,692, which are incorporated by reference herein in their entirety and for all purposes.

In various embodiments, which can include any of the foregoing examples or embodiments, the electrostatic adhesion voltage does not vary in time and may be turned on or off. In various other embodiments, the electrostatic adhesion voltage may be time-varying on each electrode, and may even reverse polarity at regular time-intervals to facilitate rapid attachment and detachment of the foreign object from any desired electroadhesive gripping surface(s) and/or end effector(s). In some embodiments, the electrostatic adhesion voltage might not be switched off sharply to release the foreign object, but rather polarity can be reversed for a fixed amount of time in order to ensure a rapid release of the object. In still further embodiments, the electrostatic adhesion voltage can have polarity reversed with a decreasing magnitude over time in order to facilitate rapid release of the object.

In various embodiments, the applied electroadhesive voltage or gripping force can be reduced or varied on one or more of the electroadhesive gripping surfaces to allow for greater flexibility in manipulating or controlling the foreign object. For instance, a reduction in voltage or force at one or more select gripping surface(s) can result in the foreign object slipping or being repositioned within the electroadhesive gripping system. Such a variable electroadhesive force can be used to modulate friction between a gripping surface and the object, so as to reposition objects by controllably sliding objects within or about the gripping surface. A suitable increased electroadhesive gripping force can then be reapplied after such a controlled slip or repositioning. As a specific non-limiting example, one or all of the electroadhesive gripping surfaces on segments 910a and 910f in FIG. 9C can have the voltage provided thereto reduced such that the gripped foreign object 916 slips a certain amount. After a desired amount of slippage, a sufficient voltage can be reapplied to strengthen the electroadhesive grip again. Such controlled variances in voltage and resulting electroadhesive force can be particularly effective when multiple fingers or end effectors with numerous electroadhesive gripping surfaces are used, such as in the case of the robotic hand embodiment of FIG. 10 below.

Still further applications can involve even more complex and integrated systems involving more fingers and more electroadhesive gripping surfaces. Moving next to FIG. 10 an exemplary robotic hand having numerous fingers, electroadhesive gripping surfaces and actuators is shown in front perspective view. Electroadhesive gripping robotic hand 1000 can include numerous hand-like components, such as a palm region, three fingers 1071a, 1070b, 1070c and an opposable thumb 1075. Each of these items can include multiple electroadhesive gripping surfaces 1010x, which are preferably movable and configurable with respect to each other. For example, electroadhesive gripping surfaces 1010a, 1010b and 1010c are located on the fingers of robotic hand 1000, electroadhesive gripping surfaces 1010d and 1010e are located on the palm region of the hand, and electroadhesive gripping surfaces 1010f and 1010g are located on the opposable thumb 1075. Further electroadhesive gripping surfaces are also present on the hand 1000, and even more can be included if desired, although a complete listing is not provided here for purposes of simplicity.

The three fingers 1070a, 1070b, 1070c and palm region 1010d, 1010e can be controlled in part through the use of multiple cables 1081, which can be driven by actuators. These cables driven by actuators, or any other suitable actuating components for that matter, do not necessarily need to be able to carry heavy loads, as their primary purpose is to position the various electroadhesive gripping surfaces about the surfaces of a handled foreign object. In various embodiments, the cable actuators 1081 can be used to independently control each finger 1070x separately, such that the fingers can extend in different directions and lengths, as may be desired. Various further details regarding cable actuators in robotic applications will be readily understood by those skilled in the art, and are not of special focus here.

In addition to the various fingers, electroadhesive gripping surfaces and actuating components, a plurality of sensors 1090 or other feedback components can also be included on electroadhesive gripping robotic hand 1000. Such sensors 1090 or feedback items can be used to detect when a foreign object is suitably gripped, when a gripped object is slipping or moving, and/or how much of a foreign object is gripped (e.g., number of sheets of paper), among other potentially detected items, such as contact or slip. This information can be used to manually or automatically correct or adjust voltage, positioning, motion and/or other aspects of the hand, fingers or thumb, as may be appropriate. In applications where such sensing elements are located directly behind the electroadhesive gripping surfaces and can be affected by the electroadhesive gripping voltages, a separate conductive shielding layer can be incorporate to minimize these interactions. This shielding layer can be located either on the outer surface of the sensor layer or integrated into the appropriate surface (such as on the surface opposite to the one that is in contact with the foreign object to be gripped or manipulated).

Figure 11A:
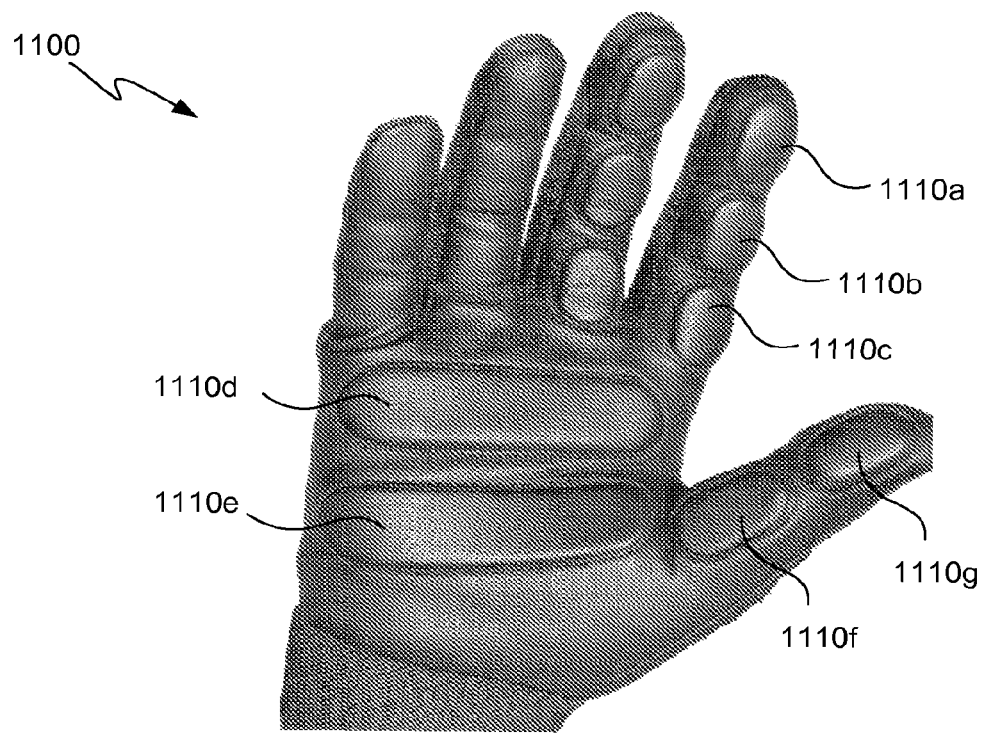
FIG. 11A illustrates in side perspective view an exemplary application of a wearable glove having multiple electroadhesive gripping surfaces located along the outer surfaces according to one embodiment of the present invention.

Still further applications can involve the use of electroadhesive gripping surfaces to assist users with gripping tough object, or in the event of user arthritis or hand tremors, for example. FIG. 11A illustrates in side perspective view an exemplary application of a wearable glove having multiple electroadhesive gripping surfaces located along its outer surfaces according to one embodiment of the present invention. Wearable glove 1100 includes a number of electroadhesive gripping surfaces, such as gripping surfaces 1110a, 1110b, and 1110c on the index finger, gripping surfaces 1110d and 1110e located across a palm region, and gripping surfaces 1110e and 1110f located on the thumb. A suitably strong insulator can be used between the electroadhesive gripping surfaces and the inner region where the hand of a user is inserted, so as to provide safety to the user. A suitable application of voltage across various electroadhesive gripping surfaces 1110x can then aid the wearer in gripping an object.

Figure 11B:
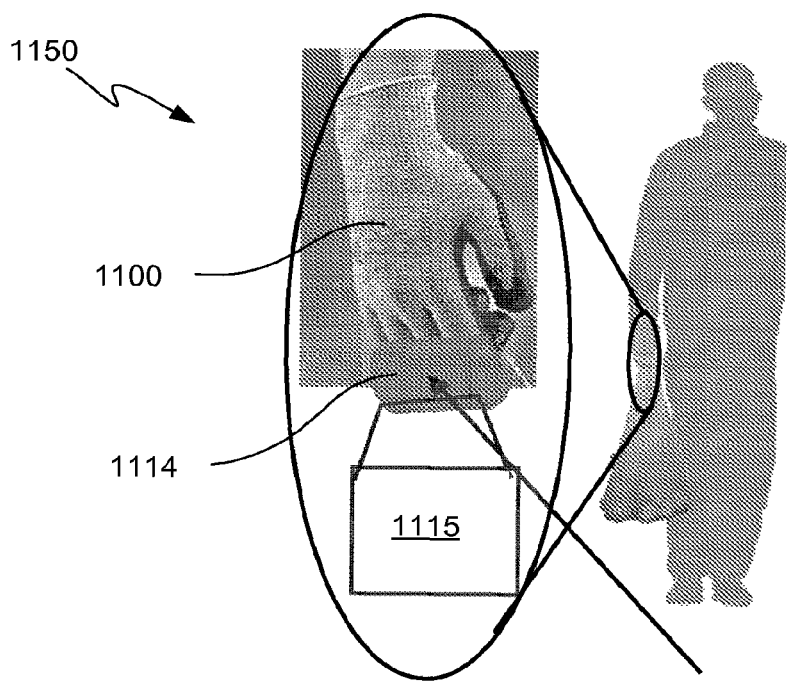
FIG. 11B illustrates in block diagram format an exemplary application of the wearable glove of FIG. 11A being used to aid in the gripping of a bag strap to carry an associated bag according to one embodiment of the present invention.

An exemplary application of such a wearable glove is to reduce the mechanical force that needs to be exerted by the person's fingers to securely grip an object. Another exemplary application is shown in FIG. 11B, which illustrates in block diagram format the wearable glove of FIG. 11A being used to aid in the gripping of a bag strap to carry an associated bag. As shown in exemplary arrangement 1150, the hand of a user is inserted into wearable glove 1100, after which the fingers of the hand and glove combination are placed underneath a strap or handle for attached foreign object 1114. Weighted bag 115 can then be strapped to or otherwise supported by foreign object 1114. Once the fingers of the hand and glove combination are placed through the appropriate strap or handle, a button or other actuator can be pressed to activate the voltage to the various electroadhesive gripping surfaces on the surface of the glove 1100. This can effectively render the glove as stiff, such that no further gripping force is needed by the user upon actually lifting the object 1114 and bag 1115.

Method of Use

Figure 12:
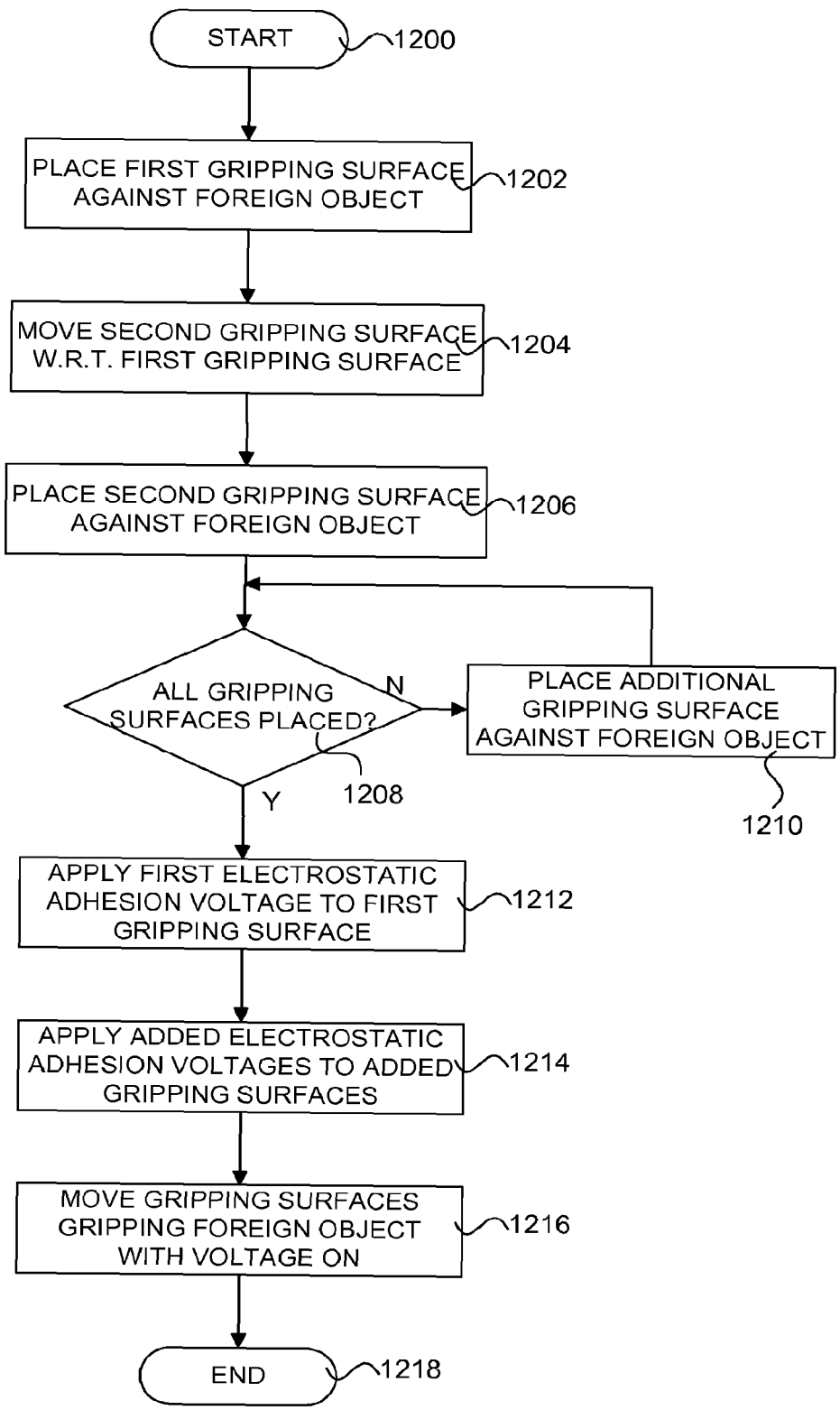
FIG. 12 provides a flowchart of an exemplary method of gripping an object using electroadhesive force according to one embodiment of the present invention.

Although an immense variety of applications and methods of lifting, moving or otherwise handling an object using the electroadhesive end effectors, gripping surfaces and other arrangements as described herein can be imagined, a basic method of moving an object is provided here as an example. Turning lastly to FIG. 12, a flowchart of an exemplary method of moving an object using electroadhesive force according to one embodiment of the present invention is provided. It will be readily appreciated that not every method step set forth in this flowchart is always necessary, and that further steps not set forth herein may also be included. Furthermore, the exact order of steps may be altered as desired for various applications.

Beginning with a start step 1200, a first electroadhesive gripping surface is placed against a first surface region of a foreign object at process step 1202. Again, such a placement results in a first line normal to a first surface of contact between the first electroadhesive gripping surface and the foreign object surface. At subsequent process step 1204, a second electroadhesive gripping surface is moved with respect to the first electroadhesive gripping surface. Such movement could also take place prior to the first gripping surface being placed against the foreign object, if desired. At the following process step 1206, the second electroadhesive gripping surface is then placed against the foreign object. Again, such a placement results in a second line normal to a second surface of contact between the second electroadhesive gripping surface and the foreign object surface. In one embodiment, these first and second normal lines are not substantially parallel with respect to each other. This can be considered as the first and second surfaces of contact not lying within the same plane. It will be readily appreciated that some embodiments may arise where the normal lines are parallel, but the first and second surfaces still do not lie within the same plane, and such embodiments are contemplated for use in the present invention.

After process step 1206, a decision step 1208 inquires as to whether all electroadhesive gripping surfaces have been placed against the foreign object. If not, then an additional electroadhesive gripping surface is placed against the foreign object at process step 1210, after which decision step 1208 is repeated. If all electroadhesive gripping surfaces that are to be used have been placed, however, then the method continues to process step 1212, where a first electrostatic adhesion voltage is applied to the first electroadhesive gripping surface. At process step 1214, further electrostatic adhesion voltage(s) are applied to the second and any other additional electroadhesive gripping surfaces. In one embodiment, such voltages can be applied in order at different times, and in another embodiment, such voltages can be applied simultaneously (i.e., steps 1212 and 1214 are performed in parallel). In still further embodiments, such voltages can be applied prior to the gripping surfaces being placed up against the foreign object.

Once all of the appropriate voltages are applied, such that the foreign object is suitably clamped or coupled to the electroadhesive gripping surfaces and is thereby "gripped," then the gripping surfaces gripping the foreign object are moved while the voltages are on at process step 1216. Of course, such movement of the activated electroadhesive gripping surfaces results in the movement or handling of the foreign object as well. The method then finishes at and end step 1218. Further steps not depicted can include, for example, reducing or turning off the electroadhesive voltage to the electroadhesive gripping surfaces, and removing the electroadhesive end effectors or gripping surfaces from the foreign object. Still further steps can include reducing or varying the applied electroadhesive voltage or gripping force, such that the foreign object can be allowed to slip or be repositioned within the electroadhesive gripping system. A suitable increased electroadhesive gripping force can then be reapplied after such a controlled slip or repositioning, as desired.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Various changes and modifications may be practiced, and it is understood that the invention is not to be limited by the foregoing details, but rather is to be defined by the scope of the claims.

What is claimed is:

1. An electroadhesive device, comprising:
   a deformable electroadhesive gripping surface configured to be placed against a first surface region of a foreign object; and
   one or more electrodes situated proximate said deformable electroadhesive gripping surface and configured to produce a first electrostatic force between the electroadhesive device and the foreign object, the first electrostatic force being provided through said deformable electroadhesive gripping surface, wherein at least a portion of said deformable electroadhesive gripping surface moves closer to the first surface region of the foreign object when the first electrostatic force is produced.

2. The electroadhesive device of claim 1, wherein said electroadhesive device comprises a thin and flexible sheet.

3. The electroadhesive device of claim 2, wherein said thin and flexible sheet is adapted to conform to at least a portion of the shape of the foreign object.

4. The electroadhesive device of claim 1, wherein said deformable electroadhesive gripping surface is further configured to be placed against a second surface region of the foreign object that is separate from the first surface region while said deformable electroadhesive gripping surface is also placed against the first surface region, and wherein a second separate electrostatic force between the electroadhesive device and the foreign object is produced, the second electrostatic force being provided through said deformable electroadhesive gripping surface.

5. The electroadhesive device of claim 4, wherein at least a portion of said deformable electroadhesive gripping surface moves closer to the second surface region of the foreign object when the second separate electrostatic force is produced.

6. The electroadhesive device of claim 1, wherein the foreign object is at least partially controlled by the electroadhesive device while the electrostatic force is applied.

7. The electroadhesive device of claim 1, wherein the electrostatic force is sufficient to maintain a current position of the electroadhesive device relative to the foreign object.

8. The electroadhesive device of claim 1, further including:
an actuating component coupled to said deformable electroadhesive gripping surface, said actuating component configured to help position said deformable electroadhesive gripping surface with respect to the foreign object.

9. The electroadhesive device of claim 1, wherein said one or more electrodes comprises a plurality of electrodes having discrete shapes that are arranged in a pattern across said deformable electroadhesive gripping surface.

10. An electroadhesive gripper, comprising:
a first electroadhesive gripping surface region configured to be placed against a first surface region of a foreign object, said first electroadhesive gripping surface region being proximate to at least one electrode; and
a second electroadhesive gripping surface region configured to be placed against a second surface region of the foreign object, said second electroadhesive gripping region being proximate to at least one electrode, wherein said first and second electroadhesive gripping surface regions are separate from each other, and wherein said first and second electroadhesive gripping surface regions combine to provide an overall electroadhesive force that operates to hold the foreign object against said first and second electroadhesive gripping surface regions while the foreign object is held, moved or manipulated by the electroadhesive gripper.

11. The electroadhesive gripper of claim 10, wherein said first and second electroadhesive gripping surface regions are disposed on the same common surface of the gripper.

12. The electroadhesive gripper of claim 10, wherein said electroadhesive gripper comprises a flat sheet.

13. The electroadhesive gripper of claim 10, further including:
a plurality of electrodes located proximate said first electroadhesive gripping surface region, said second electroadhesive gripping surface region, or both.

14. The electroadhesive gripper of claim 13, wherein said plurality of electrodes are all disposed on the same common surface of the gripper.

15. The electroadhesive gripper of claim 13, wherein said plurality of electrodes comprise discrete shapes that are arranged in a pattern across said first electroadhesive gripping surface region.

16. The electroadhesive gripper of claim 13, wherein said plurality of electrodes are arranged in an interdigitated pattern.

17. The electroadhesive gripper of claim 13, wherein said electroadhesive gripper comprises a flat, thin and flexible sheet adapted to conform to an irregular surface of the foreign object.

18. The electroadhesive gripper of claim 13, wherein said plurality of electrodes comprise discrete shapes that are arranged in a pattern across a flat sheet.

19. An electroadhesive veil, comprising:
a thin and substantially flexible sheet having at least one electroadhesive gripping surface configured to be placed against a foreign object, said sheet having no rigid backing structure; and
one or more electrodes located about said sheet and situated proximate the at least one electroadhesive gripping surface, said one or more electrodes being configured to produce an electrostatic force between the electroadhesive veil and the foreign object, the electrostatic force being provided through the at least one electroadhesive gripping surface, wherein at least a portion of said sheet substantially conforms to the shape of the foreign object.

20. The electroadhesive veil of claim 19, wherein at least a portion of the at least one electroadhesive gripping surface moves closer to the foreign object when the electrostatic force is produced.

* * * * *